(12) United States Patent
Spears et al.

(10) Patent No.: US 7,294,278 B2
(45) Date of Patent: Nov. 13, 2007

(54) METHOD FOR OXYGENATING WASTEWATER

(75) Inventors: J. Richard Spears, Bloomfield Hills, MI (US); Richard Crilly, Windsor (CA); Ray Rydman, Freeland, MI (US); James Gessert, Colorado Springs, CO (US); Steve Myrick, Tustin, CA (US)

(73) Assignees: Wayne State University, Detroit, MI (US); TherOx, Inc., Irvine, CA (US); DynamOx, Inc., Irvine, CA (US)

( * ) Notice: Subject to any disclaimer, the term of this patent is extended or adjusted under 35 U.S.C. 154(b) by 98 days.

(21) Appl. No.: 11/267,795

(22) Filed: Nov. 4, 2005

(65) Prior Publication Data

US 2006/0054554 A1 Mar. 16, 2006

Related U.S. Application Data

(62) Division of application No. 09/632,530, filed on Aug. 4, 2000, now Pat. No. 7,008,535.

(51) Int. Cl.
*C02F 3/00* (2006.01)

(52) U.S. Cl. .................. 210/758; 210/760; 210/71; 210/150; 261/115

(58) Field of Classification Search ............... 210/758, 210/760, 761, 220, 242.2, 241, 242.1, 150–151; 261/115–118
See application file for complete search history.

(56) References Cited

U.S. PATENT DOCUMENTS

| 604,931 A | 5/1898 | Eisendrath |
| 1,940,341 A | 12/1933 | Bansen et al. .................. 75/27 |
| 2,195,273 A | 3/1940 | Everson ......................... 210/28 |
| 2,474,665 A | 6/1949 | Guarino ....................... 128/214 |
| 2,700,384 A | 1/1955 | Ivory .......................... 128/204 |
| 2,702,035 A | 2/1955 | Gibbon, Jr. et al. ........ 128/214 |
| 2,760,922 A | 8/1956 | Williams, Jr. .................. 204/1 |
| 2,827,901 A | 3/1958 | Jones ......................... 128/214 |
| 2,847,008 A | 8/1958 | Taylor et al. ............... 128/214 |
| 2,876,769 A | 3/1959 | Cordova ..................... 128/214 |
| 2,975,606 A | 3/1961 | Karwat ........................... 62/18 |

(Continued)

FOREIGN PATENT DOCUMENTS

| DE | 2 343 845 | 3/1974 |
| DE | 2649126 A1 | 5/1978 |
| DE | 4105726 C1 | 9/1992 |
| EP | 0 238 773 A1 | 3/1986 |
| EP | 0 279 379 A1 | 8/1988 |

(Continued)

OTHER PUBLICATIONS

Padmavathy Guttikonda et al., "Effect of Topical O2-Supersaturated Normal Saline on UV Light-Induced Mouse Ear Inflammation," SSID Dermatology Session Abstract, vol. 44, No. 1, p. 51A, Jan. 1996.

(Continued)

*Primary Examiner*—Chester T. Barry
(74) *Attorney, Agent, or Firm*—Margaret A. Kivinski

(57) ABSTRACT

A method and apparatus creates gas-enriched fluid that is used to treat wastewater. In one embodiment, the wastewater is withdrawn from a supply of wastewater to be treated, and the wastewater is delivered in an atomized manner to a vessel pressurized with gas to form gas-enriched wastewater. The gas-enriched wastewater is then delivered to the supply of wastewater to be treated.

20 Claims, 11 Drawing Sheets

U.S. PATENT DOCUMENTS

| | | | |
|---|---|---|---|
| 3,037,504 A | 6/1962 | Everett | 128/214 |
| 3,097,645 A | 7/1963 | Lester | 128/194 |
| 3,133,132 A | 5/1964 | Loeb et al. | 264/49 |
| 3,142,296 A | 7/1964 | Love | 128/214 |
| 3,158,150 A | 11/1964 | Croasdaile et al. | 128/1 |
| 3,291,463 A | 12/1966 | Rousseau et al. | 261/100 |
| 3,295,684 A | 1/1967 | Webb | 210/314 |
| 3,300,051 A | 1/1967 | Mitchell | 210/339 |
| 3,406,136 A | 10/1968 | Scarso et al. | 260/23.7 |
| 3,437,450 A | 4/1969 | Greenwood | 23/285.5 |
| 3,456,928 A | 7/1969 | Selway | 261/22 |
| 3,459,565 A | 8/1969 | Jones et al. | 106/40 |
| 3,468,136 A | 9/1969 | Swenson et al. | 62/64 |
| 3,498,286 A | 3/1970 | Polanyi et al. | 128/2 |
| 3,512,517 A | 5/1970 | Kadish et al. | 128/2 |
| 3,584,792 A | 6/1971 | Johnson | 239/424 |
| 3,623,474 A | 11/1971 | Heilman et al. | 128/2 R |
| 3,628,758 A | 12/1971 | Nichols | 244/135 |
| 3,648,694 A | 3/1972 | Mogos et al. | 128/214 F |
| 3,661,724 A | 5/1972 | Strickler | 204/1 |
| 3,701,345 A | 10/1972 | Heilman et al. | 128/2 R |
| 3,721,231 A | 3/1973 | Hubert | 128/2.05 R |
| 3,731,679 A | 5/1973 | Wilhelmson et al. | |
| 3,752,145 A | 8/1973 | Runnells et al. | 128/2 R |
| 3,761,065 A | 9/1973 | Rich et al. | 261/76 |
| 3,795,088 A | 3/1974 | Esmond | 55/206 |
| 3,812,843 A | 5/1974 | Wootten et al. | 128/2 R |
| 3,828,767 A | 8/1974 | Spiroff | 128/2.05 |
| 3,841,308 A | 10/1974 | Tate | 128/2 M |
| 3,851,646 A | 12/1974 | Sarns | 128/214 R |
| 3,862,715 A | 1/1975 | Remenyik | 233/15 |
| 3,881,483 A | 5/1975 | Sausse | 128/214 R |
| 3,881,990 A | 5/1975 | Burton et al. | 195/1.7 |
| 3,898,637 A | 8/1975 | Wolstenholme | 340/239 R |
| 3,911,138 A | 10/1975 | Clark, Jr. | 424/352 |
| 3,921,622 A | 11/1975 | Cole | 128/2 V |
| 3,927,981 A | 12/1975 | Viannay et al. | 23/258.5 |
| 3,954,921 A | 5/1976 | Yoshida et al. | 261/116 |
| 3,956,124 A | 5/1976 | Fast et al. | 210/600 |
| 3,957,585 A | 5/1976 | Malick | 195/109 |
| 3,963,503 A | 6/1976 | Mackenzie | 106/40 V |
| 3,966,439 A | 6/1976 | Vennos | 55/270 |
| 3,972,721 A | 8/1976 | Hammel et al. | 106/40 V |
| 3,995,444 A | 12/1976 | Clark et al. | 62/306 |
| 4,003,369 A | 1/1977 | Heilman et al. | 128/2 M |
| 4,008,047 A | 2/1977 | Petersen | 23/258.5 M |
| 4,027,045 A | 5/1977 | Fedotkin et al. | 426/312 |
| 4,038,430 A | 7/1977 | Drake et al. | 427/248 E |
| 4,039,639 A | 8/1977 | Kankel et al. | 261/121 R |
| 4,041,180 A | 8/1977 | Wilson | 426/11 |
| 4,055,498 A | 10/1977 | Radnoti | 210/94 |
| 4,064,047 A | 12/1977 | Bernreiter et al. | 210/96 R |
| 4,071,443 A | 1/1978 | Gorski et al. | 210/7 |
| 4,104,074 A | 8/1978 | Rostoker | 106/40 V |
| 4,122,858 A | 10/1978 | Schiff | 128/348 |
| 4,155,362 A | 5/1979 | Jess | 128/214 F |
| 4,175,545 A | 11/1979 | Termanini | 128/666 |
| 4,196,726 A | 4/1980 | Ronzi | 128/207.27 |
| 4,196,730 A | 4/1980 | Wilson | 128/214 |
| 4,205,042 A | 5/1980 | Lobdell et al. | 422/47 |
| 4,235,095 A | 11/1980 | Liebermann | 73/19 |
| 4,239,729 A | 12/1980 | Hasegawa et al. | 422/48 |
| 4,275,020 A | 6/1981 | DiGregorio et al. | 261/111 |
| 4,285,977 A | 8/1981 | Yezek et al. | 426/67 |
| 4,303,432 A | 12/1981 | Torobin | 65/21.4 |
| 4,304,257 A | 12/1981 | Webster | 137/559 |
| 4,312,341 A | 1/1982 | Zissimopoulos et al. | 128/214 E |
| 4,313,828 A | 2/1982 | Brownlee | 210/198.2 |
| 4,317,731 A | 3/1982 | Roberts, Jr. et al. | 210/741 |
| 4,321,691 A | 3/1982 | Norton | 365/8 |
| 4,323,420 A | 4/1982 | Masnari et al. | 156/628 |
| 4,323,983 A | 4/1982 | Lee et al. | 365/8 |
| 4,332,907 A | 6/1982 | Vieli | 501/39 |
| 4,332,908 A | 6/1982 | Vieli | 501/39 |
| 4,344,429 A | 8/1982 | Gupton et al. | 128/214 R |
| 4,347,326 A | 8/1982 | Iwami et al. | 501/39 |
| 4,349,892 A | 9/1982 | Suzuki et al. | 365/8 |
| 4,354,502 A | 10/1982 | Colley et al. | 128/663 |
| 4,362,621 A | 12/1982 | Dobna et al. | 210/450 |
| 4,366,169 A | 12/1982 | White | 424/285 |
| 4,368,478 A | 1/1983 | Koto | 346/140 R |
| 4,372,491 A | 2/1983 | Fishgal | 239/102 |
| 4,375,812 A | 3/1983 | Vaseen et al. | 128/207.27 |
| 4,378,797 A | 4/1983 | Osterholm | 604/24 |
| 4,382,288 A | 5/1983 | Silverman | 365/8 |
| 4,385,635 A | 5/1983 | Ruiz | 128/658 |
| 4,393,863 A | 7/1983 | Osterholm | 128/1 R |
| 4,401,431 A | 8/1983 | Arp | 604/4 |
| 4,406,656 A | 9/1983 | Hattler et al. | 604/280 |
| 4,423,725 A | 1/1984 | Baran et al. | 128/207.15 |
| 4,432,069 A | 2/1984 | Rose et al. | 365/8 |
| 4,436,579 A | 3/1984 | Rose et al. | 156/626 |
| 4,442,843 A | 4/1984 | Rasor et al. | 128/660 |
| 4,443,480 A | 4/1984 | Clark, Jr. | 424/352 |
| 4,445,500 A | 5/1984 | Osterholm | 128/1 R |
| 4,445,886 A | 5/1984 | Osterholm | 604/28 |
| 4,445,887 A | 5/1984 | Osterholm | 604/28 |
| 4,445,896 A | 5/1984 | Gianturco | 604/238 |
| 4,448,188 A | 5/1984 | Loeb | 128/6 |
| 4,450,841 A | 5/1984 | Osterholm | 128/632 |
| 4,451,251 A | 5/1984 | Osterholm | 604/24 |
| 4,459,977 A | 7/1984 | Pizon et al. | 128/1 D |
| 4,466,804 A | 8/1984 | Hino | 604/4 |
| 4,475,666 A | 10/1984 | Bilbrey et al. | 222/14 |
| 4,493,692 A | 1/1985 | Reed | 604/4 |
| 4,502,129 A | 2/1985 | Suzuki et al. | 365/8 |
| 4,509,523 A | 4/1985 | Pevsner | 128/658 |
| 4,531,936 A | 7/1985 | Gordon | 604/49 |
| 4,536,293 A | 8/1985 | Babineaux, III | 210/717 |
| 4,537,387 A | 8/1985 | Danby et al. | 251/331 |
| 4,538,622 A | 9/1985 | Samson et al. | 128/772 |
| 4,540,399 A | 9/1985 | Litzie et al. | 607/4 |
| 4,569,836 A | 2/1986 | Gordon | 424/1.1 |
| 4,572,203 A | 2/1986 | Feinstein | 128/661 |
| 4,573,476 A | 3/1986 | Ruiz | 128/658 |
| 4,576,590 A | 3/1986 | Fiddian-Green | 604/26 |
| 4,581,012 A | 4/1986 | Brown et al. | 604/43 |
| 4,582,181 A | 4/1986 | Samson | 128/348.1 |
| 4,596,210 A | 6/1986 | Schmidtke | 123/1 A |
| 4,597,412 A | 7/1986 | Stark | 137/606 |
| 4,599,462 A | 7/1986 | Michl | 568/702 |
| 4,602,987 A | 7/1986 | Bonaventura et al. | 204/129 |
| 4,610,661 A | 9/1986 | Possis et al. | 604/52 |
| 4,619,274 A | 10/1986 | Morrison | 128/772 |
| 4,644,808 A | 2/1987 | Lecoffre | 73/866 |
| 4,645,518 A | 2/1987 | Roffelsen | 553/203 |
| 4,648,384 A | 3/1987 | Schmukler | 128/1 D |
| 4,648,865 A | 3/1987 | Aigner | 604/4 |
| 4,657,532 A | 4/1987 | Osterholm | 604/24 |
| 4,657,756 A | 4/1987 | Rasor et al. | 424/9 |
| 4,658,601 A | 4/1987 | Burchell et al. | 62/514 |
| 4,661,092 A | 4/1987 | Popovich et al. | 604/26 |
| 4,661,094 A | 4/1987 | Simpson | 604/53 |
| 4,664,680 A | 5/1987 | Weber | 55/48 |
| 4,666,668 A | 5/1987 | Lidorenko et al. | 422/48 |
| 4,671,287 A | 6/1987 | Fiddian-Green | 128/631 |
| 4,674,480 A | 6/1987 | Lemelson | 128/1.1 |
| 4,674,540 A | 6/1987 | Takei et al. | 137/625.65 |
| 4,677,100 A | 6/1987 | Nakagawa et al. | 514/202 |
| 4,681,119 A | 7/1987 | Rasor et al. | 128/660 |
| 4,686,085 A | 8/1987 | Osterholm | 422/45 |
| 4,689,149 A | 8/1987 | Kanno et al. | 210/321.3 |
| 4,696,195 A | 9/1987 | Savonlahti et al. | 73/864.84 |

| Patent No. | | Date | Inventor | Class |
|---|---|---|---|---|
| 4,713,344 | A | 12/1987 | Markhart, III | 435/287 |
| 4,715,378 | A | 12/1987 | Pope, Jr. et al. | 128/344 |
| 4,721,117 | A | 1/1988 | Mar et al. | 128/772 |
| 4,723,939 | A | 2/1988 | Anaise | 604/113 |
| 4,729,876 | A | 3/1988 | Hennessy et al. | 422/103 |
| 4,735,750 | A | 4/1988 | Damann | 261/29 |
| 4,739,768 | A | 4/1988 | Engelson | 128/658 |
| 4,739,770 | A | 4/1988 | Stephens et al. | 128/675 |
| 4,748,984 | A | 6/1988 | Patel | 128/658 |
| 4,748,986 | A | 6/1988 | Morrison et al. | 128/772 |
| 4,758,431 | A | 7/1988 | Osterholm | 424/149 |
| 4,761,288 | A | 8/1988 | Mezei | 424/450 |
| 4,769,241 | A | 9/1988 | Heldebrant et al. | 424/161 |
| 4,770,168 | A | 9/1988 | Rusz et al. | 128/203.132 |
| 4,793,350 | A | 12/1988 | Mar et al. | 128/344 |
| 4,800,890 | A | 1/1989 | Cramer | 128/657 |
| 4,802,650 | A | 2/1989 | Stricker | 251/117 |
| 4,804,358 | A | 2/1989 | Karcher et al. | 600/17 |
| 4,808,163 | A | 2/1989 | Laub | 604/105 |
| 4,808,378 | A | 2/1989 | Nakanishi et al. | 422/48 |
| 4,815,446 | A | 3/1989 | McIntosh | 600/3 |
| 4,827,941 | A | 5/1989 | Taylor et al. | 128/657 |
| 4,828,543 | A | 5/1989 | Weiss et al. | 604/4 |
| 4,830,849 | A | 5/1989 | Osterholm | 424/2 |
| 4,834,719 | A | 5/1989 | Arenas | 604/243 |
| 4,840,617 | A | 6/1989 | Osterholm | 604/174 |
| 4,846,193 | A | 7/1989 | Tremulis et al. | 128/772 |
| 4,850,954 | A | 7/1989 | Charvin | 604/4 |
| 4,850,958 | A | 7/1989 | Berry et al. | 604/26 |
| 4,865,836 | A | 9/1989 | Long, Jr. | 424/5 |
| 4,869,717 | A | 9/1989 | Adair | 604/51 |
| 4,871,450 | A | 10/1989 | Goodrich et al. | 210/151 |
| 4,874,509 | A | 10/1989 | Bullock | 210/169 |
| 4,874,581 | A | 10/1989 | Sutherland et al. | 422/46 |
| 4,875,489 | A | 10/1989 | Messner et al. | 128/772 |
| 4,877,031 | A | 10/1989 | Conway et al. | 128/344 |
| 4,882,097 | A * | 11/1989 | Shannon | 261/35 |
| 4,884,065 | A | 11/1989 | Crouse et al. | 340/632 |
| 4,919,650 | A | 4/1990 | Feingold et al. | 604/67 |
| 4,919,895 | A | 4/1990 | Heldebrant et al. | 422/129 |
| 4,921,478 | A | 5/1990 | Solano et al. | 604/53 |
| 4,923,442 | A | 5/1990 | Segall et al. | 604/52 |
| 4,927,418 | A | 5/1990 | Dake et al. | 604/264 |
| 4,927,623 | A | 5/1990 | Long, Jr. | 424/5 |
| 4,929,317 | A | 5/1990 | Nishimura et al. | 204/59 R |
| 4,930,319 | A | 6/1990 | Bee et al. | 62/69 |
| 4,953,553 | A | 9/1990 | Tremulis | 128/637 |
| 4,961,731 | A | 10/1990 | Bodicky et al. | 604/264 |
| 4,963,130 | A | 10/1990 | Osterholm | 604/24 |
| 4,964,409 | A | 10/1990 | Tremulis | 128/657 |
| 4,965,022 | A | 10/1990 | Litz | 261/36.1 |
| 4,966,163 | A | 10/1990 | Kraus et al. | 128/772 |
| RE33,451 | E | 11/1990 | Clark, Jr. | 514/628 |
| 4,968,307 | A | 11/1990 | Dake et al. | 604/264 |
| 4,968,483 | A | 11/1990 | Müller et al. | 422/45 |
| 4,969,878 | A | 11/1990 | Schmidt et al. | 604/264 |
| 4,973,493 | A | 11/1990 | Guire | 427/2 |
| 4,973,558 | A | 11/1990 | Wilson et al. | 435/240.242 |
| 4,979,959 | A | 12/1990 | Guire | 623/66 |
| 4,981,691 | A | 1/1991 | Osterholm et al. | 424/422 |
| 4,983,747 | A | 1/1991 | Nishimura et al. | 549/423 |
| 4,985,550 | A | 1/1991 | Charpiot et al. | 536/18.4 |
| 4,986,809 | A | 1/1991 | Hattler | 604/26 |
| 4,991,588 | A | 2/1991 | Pflueger et al. | 128/662 |
| 5,000,739 | A | 3/1991 | Kulisz et al. | 604/132 |
| 5,002,582 | A | 3/1991 | Guire et al. | 623/66 |
| 5,006,110 | A | 4/1991 | Garrison et al. | 604/65 |
| 5,006,352 | A | 4/1991 | Zelenák née Zoltai et al. | 426/67 |
| 5,009,251 | A | 4/1991 | Pike et al. | 137/601 |
| 5,021,044 | A | 6/1991 | Sharkawy | 604/53 |
| 5,029,579 | A | 7/1991 | Trammell | 128/205.26 |
| 5,037,403 | A | 8/1991 | Garcia | 604/280 |
| 5,039,482 | A | 8/1991 | Panzani et al. | 422/46 |
| 5,044,164 | A | 9/1991 | Bee | 62/46.1 |
| 5,050,606 | A | 9/1991 | Tremulis | 128/637 |
| 5,055,109 | A | 10/1991 | Gould et al. | 604/95 |
| 5,057,120 | A | 10/1991 | Farcot | 606/194 |
| 5,059,171 | A | 10/1991 | Bridge et al. | 604/67 |
| 5,059,182 | A | 10/1991 | Laing | 604/142 |
| 5,059,851 | A | 10/1991 | Corl et al. | 310/334 |
| 5,061,236 | A | 10/1991 | Sutherland et al. | 604/4 |
| 5,061,484 | A | 10/1991 | Heldebrant | 424/78 |
| 5,067,489 | A | 11/1991 | Lind | 128/772 |
| 5,069,661 | A | 12/1991 | Trudell | 604/4 |
| 5,072,739 | A | 12/1991 | John | 128/897 |
| 5,080,885 | A | 1/1992 | Long, Jr. | 424/5 |
| 5,084,011 | A | 1/1992 | Grady | 604/24 |
| 5,086,620 | A | 2/1992 | Spears | 62/51.1 |
| 5,087,244 | A | 2/1992 | Wolinsky et al. | 604/53 |
| 5,098,376 | A | 3/1992 | Berry et al. | 604/26 |
| 5,102,390 | A | 4/1992 | Crittenden et al. | 604/96 |
| 5,104,373 | A | 4/1992 | Davidner et al. | 604/4 |
| 5,106,363 | A | 4/1992 | Nobuyoshi | 604/4 |
| 5,108,662 | A | 4/1992 | Litz et al. | 261/16 |
| 5,110,548 | A | 5/1992 | Montevecchi | 422/48 |
| 5,113,013 | A | 5/1992 | Powell et al. | 562/493 |
| 5,114,423 | A | 5/1992 | Kasprzyk et al. | 606/27 |
| 5,116,317 | A | 5/1992 | Carson, Jr. et al. | 604/96 |
| 5,119,807 | A | 6/1992 | Roberts | 128/200.24 |
| 5,124,088 | A | 6/1992 | Stumphauzer | 261/121.1 |
| 5,135,517 | A | 8/1992 | McCoy | 604/281 |
| 5,137,513 | A | 8/1992 | McInnes et al. | 604/96 |
| 5,147,311 | A | 9/1992 | Pickhard | 604/153 |
| 5,152,964 | A | 10/1992 | Leonard | 422/48 |
| 5,158,533 | A | 10/1992 | Strauss et al. | 604/4 |
| 5,158,540 | A | 10/1992 | Wijay et al. | 604/43 |
| 5,158,548 | A | 10/1992 | Lau et al. | 604/96 |
| 5,166,573 | A | 11/1992 | Brown | 310/334 |
| 5,171,216 | A | 12/1992 | Dasse et al. | 604/43 |
| 5,178,603 | A | 1/1993 | Prince | 604/6 |
| 5,180,364 | A | 1/1993 | Ginsburg | 604/53 |
| 5,181,908 | A | 1/1993 | Bell | 604/24 |
| 5,184,627 | A | 2/1993 | de Toledo | 128/772 |
| 5,186,713 | A | 2/1993 | Raible | 604/4 |
| 5,195,971 | A | 3/1993 | Sirhan | 604/96 |
| 5,199,939 | A | 4/1993 | Dake et al. | 600/3 |
| 5,203,338 | A | 4/1993 | Jang | 128/662.06 |
| 5,207,869 | A * | 5/1993 | Harmoning et al. | 159/16.1 |
| 5,209,720 | A | 5/1993 | Unger | 604/22 |
| 5,211,546 | A | 5/1993 | Isaacson et al. | 417/356 |
| 5,211,627 | A | 5/1993 | William | 604/82 |
| 5,211,636 | A | 5/1993 | Mische | 604/264 |
| 5,211,637 | A | 5/1993 | Goto et al. | 604/283 |
| 5,213,576 | A | 5/1993 | Abiuso et al. | 604/96 |
| 5,215,680 | A | 6/1993 | D'Arrigo | 252/307 |
| 5,217,492 | A | 6/1993 | Guire et al. | 623/11 |
| 5,218,958 | A | 6/1993 | Cooper | 128/205.26 |
| 5,219,099 | A | 6/1993 | Spence et al. | 222/325 |
| 5,219,326 | A | 6/1993 | Hattler | 604/26 |
| 5,221,483 | A | 6/1993 | Glenn et al. | 210/641 |
| 5,226,888 | A | 7/1993 | Arney | 604/96 |
| 5,236,416 | A | 8/1993 | McDaniel et al. | 604/67 |
| 5,240,004 | A | 8/1993 | Walinsky et al. | 128/662.06 |
| 5,241,985 | A | 9/1993 | Faust et al. | 137/505.13 |
| 5,252,159 | A | 10/1993 | Arney | 156/169 |
| 5,254,772 | A | 10/1993 | Dukat et al. | 570/170 |
| 5,261,875 | A | 11/1993 | Spears | 604/24 |
| 5,271,406 | A | 12/1993 | Ganguly et al. | 128/663.01 |
| 5,273,052 | A | 12/1993 | Kraus et al. | 128/772 |
| 5,277,176 | A | 1/1994 | Habashi et al. | 128/200.24 |
| 5,279,562 | A | 1/1994 | Sirhan et al. | 604/96 |
| 5,279,565 | A | 1/1994 | Klein et al. | 604/105 |
| 5,302,168 | A | 4/1994 | Hess | 600/3 |
| 5,304,325 | A | 4/1994 | Kaufman et al. | 252/312 |
| 5,308,320 | A | 5/1994 | Safar et al. | 604/4 |

| | | | |
|---|---|---|---|
| 5,322,500 A | 6/1994 | Johnson et al. | 604/4 |
| 5,322,508 A | 6/1994 | Viera | 604/52 |
| 5,322,511 A | 6/1994 | Armbruster et al. | 604/155 |
| 5,324,263 A | 6/1994 | Kraus et al. | 604/96 |
| 5,324,436 A | 6/1994 | John et al. | 210/638 |
| 5,334,142 A | 8/1994 | Paradis | 604/53 |
| 5,339,816 A | 8/1994 | Akamatsu et al. | 128/661.09 |
| 5,341,818 A | 8/1994 | Abrams et al. | 128/772 |
| 5,342,517 A | 8/1994 | Kopf | 210/228 |
| 5,344,393 A | 9/1994 | Roth et al. | 604/4 |
| 5,344,402 A | 9/1994 | Crocker | 604/96 |
| 5,344,930 A | 9/1994 | Riess et al. | 544/84 |
| 5,356,388 A | 10/1994 | Sepetka et al. | 604/164 |
| 5,360,396 A | 11/1994 | Chan | 604/26 |
| 5,366,696 A | 11/1994 | Williams | 422/45 |
| 5,368,555 A | 11/1994 | Sussman et al. | 604/4 |
| 5,370,640 A | 12/1994 | Kolff | 606/2 |
| 5,372,709 A | 12/1994 | Hood | 210/90 |
| 5,374,624 A | 12/1994 | Segel | 514/21 |
| 5,376,069 A | 12/1994 | Hattler | 604/26 |
| 5,376,083 A | 12/1994 | Mische | 604/264 |
| 5,376,240 A | 12/1994 | Kaczur et al. | 204/128 |
| 5,380,307 A | 1/1995 | Chee et al. | 604/264 |
| 5,382,407 A | 1/1995 | Leonard | 422/48 |
| 5,383,853 A | 1/1995 | Jung et al. | 604/96 |
| 5,385,821 A | 1/1995 | O'Dell et al. | 435/1 |
| 5,393,513 A | 2/1995 | Long, Jr. | 424/5 |
| 5,394,732 A | 3/1995 | Johnson et al. | 73/19.1 |
| 5,395,353 A | 3/1995 | Scribner | 604/264 |
| 5,405,329 A | 4/1995 | Durand | 604/164 |
| 5,407,424 A | 4/1995 | LaFontaine et al. | 604/4 |
| 5,407,425 A | 4/1995 | Werner et al. | 604/4 |
| 5,407,426 A | 4/1995 | Spears | 4/24 |
| 5,409,455 A | 4/1995 | Belden | 604/43 |
| 5,409,470 A | 4/1995 | McIntyre et al. | 604/283 |
| 5,411,466 A | 5/1995 | Hess | 600/3 |
| 5,413,558 A | 5/1995 | Paradis | 604/101 |
| 5,417,663 A | 5/1995 | Slettenmark | 604/126 |
| 5,417,969 A | 5/1995 | Hsu et al. | 424/78.27 |
| 5,423,741 A | 6/1995 | Frank | 604/26 |
| 5,425,703 A | 6/1995 | Feiring | 604/21 |
| 5,433,866 A | 7/1995 | Hoppe et al. | 210/748 |
| 5,434,191 A | 7/1995 | Dandliker et al. | 424/678 |
| 5,437,633 A | 8/1995 | Manning | 604/44 |
| 5,438,041 A | 8/1995 | Zheng et al. | 514/6 |
| 5,439,000 A | 8/1995 | Gunderson et al. | 128/664 |
| 5,449,342 A | 9/1995 | Hirose et al. | 604/4 |
| 5,451,211 A | 9/1995 | Neer et al. | 604/154 |
| 5,456,669 A | 10/1995 | Neer et al. | 604/154 |
| 5,456,670 A | 10/1995 | Neer et al. | 604/155 |
| 5,462,523 A | 10/1995 | Samson et al. | 604/30 |
| 5,466,216 A | 11/1995 | Brown et al. | 604/33 |
| 5,480,392 A | 1/1996 | Mous | 604/280 |
| 5,487,727 A | 1/1996 | Snider et al. | 605/49 |
| 5,494,576 A | 2/1996 | Hoppe et al. | 210/198.1 |
| 5,498,251 A | 3/1996 | Dalton | 604/282 |
| 5,500,096 A | 3/1996 | Yuan | 203/3 |
| 5,507,280 A | 4/1996 | Henkin et al. | 128/203.12 |
| 5,509,900 A | 4/1996 | Kirkman | 604/104 |
| 5,527,466 A | 6/1996 | Li et al. | 210/636 |
| 5,527,962 A | 6/1996 | Pavia et al. | 564/152 |
| 5,533,957 A | 7/1996 | Aldea | 600/16 |
| 5,562,608 A | 10/1996 | Sekins et al. | 604/20 |
| 5,569,180 A | 10/1996 | Spears | 604/24 |
| 5,569,197 A | 10/1996 | Helmus et al. | 604/96 |
| 5,573,668 A | 11/1996 | Grosh et al. | 210/490 |
| 5,582,574 A | 12/1996 | Cramer | 600/21 |
| 5,589,062 A | 12/1996 | Rice | 210/198.2 |
| 5,591,399 A | 1/1997 | Goldman et al. | 422/44 |
| 5,599,296 A | 2/1997 | Spears | 604/26 |
| 5,605,162 A | 2/1997 | Mirzaee et al. | 128/772 |
| 5,612,226 A | 3/1997 | Williams | 436/167 |
| 5,620,440 A | 4/1997 | Heckele et al. | 606/28 |
| 5,621,144 A | 4/1997 | Cooper | 564/189 |
| 5,628,755 A | 5/1997 | Heller et al. | 606/108 |
| 5,634,897 A | 6/1997 | Dance et al. | 604/35 |
| 5,647,976 A | 7/1997 | Rothe et al. | 210/137 |
| 5,670,094 A | 9/1997 | Sasaki et al. | 261/27 |
| 5,693,017 A | 12/1997 | Spears et al. | 604/132 |
| 5,695,473 A | 12/1997 | Olsen | 604/153 |
| 5,695,717 A | 12/1997 | Polaschegg et al. | 422/48 |
| 5,702,357 A | 12/1997 | Bainbridge et al. | 604/4 |
| 5,702,364 A | 12/1997 | Euteneuer et al. | 604/96 |
| 5,702,368 A | 12/1997 | Stevens et al. | 604/171 |
| 5,706,859 A | 1/1998 | Bäcklund | 137/885 |
| 5,709,654 A | 1/1998 | Klatz et al. | 604/24 |
| 5,709,658 A | 1/1998 | Sirhan et al. | 604/102 |
| 5,716,318 A | 2/1998 | Manning | 600/16 |
| 5,720,716 A | 2/1998 | Blakeslee et al. | 604/4 |
| 5,725,492 A | 3/1998 | Igo et al. | 604/4 |
| 5,730,330 A | 3/1998 | Reading | 222/113 |
| 5,730,698 A | 3/1998 | Fischell et al. | 600/3 |
| 5,730,935 A | 3/1998 | Spears | 422/44 |
| 5,735,934 A | 4/1998 | Spears | 75/414 |
| 5,738,644 A | 4/1998 | Holmes et al. | 604/4 |
| 5,752,929 A | 5/1998 | Klatz et al. | 604/51 |
| 5,766,490 A | 6/1998 | Taylor et al. | 210/758 |
| 5,772,624 A | 6/1998 | Utterberg et al. | 604/4 |
| 5,786,136 A | 7/1998 | Mayer | 435/12 |
| 5,797,874 A | 8/1998 | Spears | 604/53 |
| 5,797,876 A | 8/1998 | Spears et al. | 604/95 |
| 5,798,041 A | 8/1998 | Zuk, Jr. | 210/456 |
| 5,798,091 A | 8/1998 | Trevino et al. | 424/9.52 |
| 5,799,830 A | 9/1998 | Carroll et al. | 222/95 |
| 5,800,397 A | 9/1998 | Wilson et al. | 604/151 |
| 5,807,356 A | 9/1998 | Finch, Jr. et al. | 604/284 |
| 5,810,757 A | 9/1998 | Sweezer, Jr. et al. | 604/4 |
| 5,810,759 A | 9/1998 | Merz | 604/4 |
| 5,814,004 A | 9/1998 | Tamari | 604/4 |
| 5,814,125 A | 9/1998 | Anderson et al. | 75/414 |
| 5,814,222 A | 9/1998 | Zelenák et al. | 210/615 |
| 5,817,045 A | 10/1998 | Sever, Jr. | 604/4 |
| 5,817,046 A | 10/1998 | Glickman | 604/4 |
| 5,820,586 A | 10/1998 | Booth et al. | 604/53 |
| 5,834,519 A | 11/1998 | Spears | 514/938 |
| 5,840,067 A | 11/1998 | Berguer et al. | 604/104 |
| 5,843,023 A | 12/1998 | Cecchi | 604/44 |
| 5,843,307 A | 12/1998 | Faivre et al. | 210/192 |
| 5,849,005 A | 12/1998 | Garrison et al. | 606/1 |
| 5,849,191 A | 12/1998 | Agranonik et al. | 210/608 |
| 5,849,249 A | 12/1998 | Jones, Jr. et al. | 422/101 |
| 5,869,538 A | 2/1999 | Van Liew et al. | 514/743 |
| 5,874,093 A | 2/1999 | Eliaz et al. | 424/401 |
| 5,879,282 A | 3/1999 | Fischell et al. | 600/3 |
| 5,882,343 A | 3/1999 | Wilson et al. | 604/246 |
| 5,885,467 A | 3/1999 | Zelenák et al. | 210/758 |
| 5,891,111 A | 4/1999 | Ismael | 604/280 |
| 5,893,838 A | 4/1999 | Daoud et al. | 604/26 |
| 5,916,209 A | 6/1999 | Mick | 604/523 |
| 5,922,305 A | 7/1999 | Spears | 424/43 |
| 5,935,122 A | 8/1999 | Fourkas et al. | 604/523 |
| 5,957,899 A | 9/1999 | Spears et al. | 604/264 |
| 5,957,949 A | 9/1999 | Leonhardt et al. | 606/194 |
| 5,958,377 A | 9/1999 | Spears | 424/43 |
| 5,976,119 A | 11/1999 | Spears et al. | 604/508 |
| 5,989,210 A | 11/1999 | Morris et al. | 604/22 |
| 6,398,971 B1 | 6/2002 | Butters et al. | 210/748 |

FOREIGN PATENT DOCUMENTS

| | | |
|---|---|---|
| EP | 0 282 948 A2 | 9/1988 |
| EP | 0 291 612 B1 | 11/1988 |
| EP | 0 328 035 A2 | 2/1989 |
| EP | 0 363 516 A1 | 4/1990 |
| EP | 0 490 459 A1 | 6/1992 |
| EP | 0 597 195 A2 | 5/1994 |

| | | |
|---|---|---|
| EP | 0 619 122 A1 | 10/1994 |
| FR | 1.320.820 | 2/1963 |
| FR | 2 320 908 | 11/1977 |
| GB | 1 512 637 | 6/1978 |
| GB | 2 086 247 | 7/1981 |
| JP | 59-130812 | 7/1984 |
| JP | 59-130813 | 7/1984 |
| JP | 63-208523 | 8/1988 |
| RU | 901895 | 1/1982 |
| WO | WO 92/14404 | 9/1992 |
| WO | WO 92/14976 | 9/1992 |
| WO | WO 94/15659 | 7/1994 |
| WO | WO 95/13843 | 5/1995 |
| WO | WO 96/01593 | 1/1996 |
| WO | WO 96/17565 | 6/1996 |
| WO | WO 96/32157 | 10/1996 |
| WO | WO 96/40334 | 12/1996 |
| WO | WO 96/41987 | 12/1996 |
| WO | WO 97/11735 | 4/1997 |
| WO | WO 97/19713 | 6/1997 |
| WO | WO 97/49447 | 12/1997 |
| WO | WO 98/16203 | 4/1998 |
| WO | WO 98/46340 | 10/1998 |
| WO | WO 99/08732 | 2/1999 |
| WO | WO 99/08733 | 2/1999 |
| WO | WO 99/62584 | 12/1999 |
| WO | WO 00/04943 | 2/2000 |
| WO | WO 97/11870 A2 | 2/2002 |

OTHER PUBLICATIONS

B. Kantor et al., "Coronary Reperfusion with Aqueous Oxygen Improves Left Ventricular Ejection Fraction and May Reduce Mortality in an Ischemic Porcine Model," (Abstracts/Poster TCT-231), Amer. J. Cardiology, p. 86S, Oct. 8, 1998.

S. C. Davis et al., "Delivery of Oxygen to Cutaneous Tissue Via a Super Saturated Oxygen (SOS) Emulsion," Journal of Investigative Dermatology, vol. 112, No. 4, pp. 632, Apr. 1999.

N.M. Yusof et al., "Assessment of the Safety and Efficacy of Supersaturated Oxygen Solution: A Novel Method of Reducing Myocardial Ischaemia in PTCA," (Abstracts/Poster TCT-276), Amer. J. Cardiology, p. 100S, Oct. 8, 1998.

John Metschl, "The Supersaturation of Gases in Water and Certain Organic Liquids," vol. 28, pp. 417-437, 1924.

Frank B. Kenrick et al., "Supersaturation of Gases in Liquids," J. Phys. Chem., vol. 28, pp. 1308-1315, 1924.

Robert B. Dean, "The Formation of Bubbles," Journal of Applied Physics, vol. 15, pp. 446-451, May 1944.

P.S. Epstein et al., "On the Stability of Gas Bubbles in Liquid-Gas Solutions," The Journal of Chemical Physics, vol. 18, No. 11, pp. 1505-1509, Nov. 1950.

A. Van Cleeff et al., "Gas Hydrates of Nitrogen and Oxygen, II," RECUEIL, 84, pp. 1085-1093, 1965.

K.E. Karlson et al., "Total cardiopulmonary bypass with a new microporous Teflon membrane oxygenator," Surgery, vol. 76, No. 6, pp. 935-945, Dec. 1974.

W. Zingg et al., "Improving the Efficiency of a Tubular Membrane Oxygenator," Med. Progr. Technol. 4, pp. 139-145, 1976.

C. Boe et al., "Use of Hyperbaric Oxygen as Oxygen Source in Extracorporeal Oxygenation of Blood," Physiological and Clinical Aspects of Oxygenator Design, Elsevier North-Holland Biomedical Press, Luxembourg, 1976.

Pieter Stroev et al., "Supersaturated fluorocarbon as an oxygen source," Physiological and Clinical Aspects of Oxygenator Design, Elsevier North-Holland Biomedical Press, pp. 129-139, Luxembourg, 1976.

Edvard A. Hemmingsen, "Cavitation in gas-supersaturated solutions," Journal of Applied Physics, vol. 46, No. 1, pp. 213-218, Jan. 1976.

Robert H. Bartlett et al., "Instrumentation for cardiopulmonary bypass—past, present, and future," Medical Instrumentation, vol. 10, No. 2, pp. 119-124, Mar.-Apr. 1976.

Special Publication No. 29, "Herbicides and Fungicides—Factors affecting their Activity," The Chemical Society, Burlington House, London, Sep. 15-17, 1976.

Wayne A. Gerth et al., "Gas Supersaturation Thresholds for Spontaneous Cavitation in Water with Gas Equilibration Pressures up to 570 atml," Z. Naturforsch, 31a, pp. 1711-1716, Oct. 5, 1976.

Armand A. Lefemine et al., "Increased oxygen pressure to improve the efficiency of membrane oxygenators," Medical Instrumentation, vol. 10, No. 6, pp. 304-308, Nov.-Dec. 1976.

"Controlled Release Glass (CRG)," Standard Telecommunication Laboratories Limited, 1977.

Evard A. Hemmingsen, "Effects of Surfactants and Electrolytes on the Nucleation of Bubbles in Gas-Supersaturated Solutions," Z. Naturforsch, 33a, pp. 164-171, Oct. 25, 1977.

Phillip A. Drinker et al., "Enginerring Aspects of ECMO Technology," Artifical Organs, vol. 2, No. 1, pp. 6-11, Feb. 1978.

Robert C. Eberhart et al., "Mathematical and Experimental Methods for Design and Evaluation of Membrane Oxygenators," Artificial Organs, vol. 2, No. 1, pp. 19-34, Feb. 1978.

S. Marlow et al., "A $pO_2$ Regulation System For Membrane Oxygenators," American Society For Artificial Internal Organs, vol. XXVII, pp. 299-303, 1981.

E.H. Spratt et al., "Evaluation of a Membrane Oxygenator For Clinical Cardiopulmonary Bypass," Trans Am Soc Artif Intern Organs, vol. XXVII, pp. 285-288, 1981.

F. Valdés et al., "Ex Vivo Evaluation of a New Capillary Membrane Oxygenator," Trans Am Soc Artif Intern Organs, vol. XXVII, pp. 270-275, 1981.

Malcolm Savage, "A Preliminary Report into the Development and use of Soluble Controlled-release Glass Timing Discs Implanted into Orthodontic Appliances," British Journal of Orthodontics, vol. 9, pp. 190-193, 1982.

T. Dohi et al., "Development and Clinical Application of a New Membrane Oxygenator Using a Microporous Polysulfone Membrane," Trans Am Soc Artif Intern Organs, vol. XXVIII, pp. 338-341, 1982.

J. Miezala et al., "Evaluation of a New Low Pressure Drop Membrane Oxygenator," Trans Am Soc Artif Intern Organs, vol. XXVIII, pp. 342-349, 1982.

S. Ohtake et al., "Experimental Evaluation of Pumpless Arteriovenous ECMO With Polypropylene Hollow Fiber Membrane Oxygenator for Partial Respiratory Support," Trans Am Soc Artif Intern Organs, vol. XXIX, pp. 237-241, 1983.

F.M. Servas et al., "High Efficiency Membrane Oxygenator," Trans Am Soc Artif Intern Organs, vol. XXIX, pp. 231-236, 1983.

Webster's II New Riverside University Dictionary, p. 976, 1984.

Karl E. Karlson et al., "Initial Clinical Experience With a Low Pressure Drop Membrane Oxygenator for Cardiopulmonary Bypass in Adult Patients," The American Journal of Surgery, vol. 147, pp. 447-450, Apr. 1984.

D.W. Davidson et al., "The ability of small molecules to form clathrate hydrates of structure II," Nature, vol. 311, pp. 142-143, Sep. 13, 1984.

H. Matsuda et al., "Evaluation of a New Siliconized Polypropylene Hollow Fiber Membrane Lung for ECMO," Trans Am Soc Artif Intern Organs, vol. XXXI, pp. 599-603, 1985.

T. Kawamura et al., "ECMO in pumpless RV to LA bypass," Trans Am Soc Artif Intern Organs, vol. XXXI, pp. 616-621, 1985.

J.B. Zwischenberger et al., "Total Respiratory Support With Single Cannula Venovenous ECMO: Double Lumen Continuous Flow vs. Single Lumen Tidal Flow," Trans Am Soc Artif Intern Organs, vol. XXXI, pp. 610-615, 1985.

Yehuda Finkelstein et al., "Formation of Gas Bubbles in Supersaturated Solutions of Gases in Water," AIChE Journal, vol. 13, No. 9, pp. 1409-1419, Sep. 1985.

J.S. Tse et al., "Structure of Oxygen Clathrate Hydrate by Neutron Powder Diffraction," Journal of Inclusion Phenomena, vol. 4, pp. 235-240, 1986.

Paolo Angelini et al., "Distal Hemopperfusion During Percutaneous Translumininal Coronary Angioplasty," The American Journal of Cardiology, vol. 58, pp. 252-255, Aug. 1, 1986.

Mordecai B. Rubin et al., "Measurements of Critical Supersaturation for Homogeneous Nucleation of Bubbles," American Chemical Society, Dec. 9, 1986.
Dr. Arthur Lefebvre, "Atomization And Sprays," ASME Short Course Program, The American Society of Mechanical Engineers, May 31, 1987.
Sara Rockwell, "Tumor Radiation Responses And Tumor Oxygenation In Aging Mice," Experimental Gerontology, vol. 24, pp. 37-48, 1989.
"Fluosol® 20% Intravascular Perfluorochemical Emulsion Product Information," Alpha Therapeutic Corporation, Los Angeles, California, pp. 1-8, Dec. 1989.
T. Hondoh et al., "The Crystallographic Structure of the Natural Air-Hydrate in Greenland Dye-3 Deep Ice Core," Journal Inclusion Phenomena and Molecular Recognition in Chemistry, vol. 8, pp. 17-24, 1990.
Howard P. Grill et al., "Coronary Artery Pseudo-Occlusion Associated With the Use of an Active Hemoperfusion System During PTCA," Catheterization and Cardiovascular Diagnosis, vol. 24, pp. 58-61, 1991.
Norihiko Shiiya et al., "Effects of Hemopump Support on Left Ventricular Unloading and Coronary Blood Flow," Trans Am Soc Artif Intern Organs, vol. XXVII, pp. M361-M362, 1991.
Yehuda Tamari et al., "The Effect of High Pressure on Microporous Membrane Oxygenator Failure," Artificial Organs, vol. 15, No. 1, pp. 15-22, Feb. 1991.
Jose R. Azpiri et al., "Effects of Hemoperfusion During Percutaneous Transluminal Coronary Angioplasty on Left Ventricular Function," The American Journal of Cardiology, vol. 67, pp. 1324-1329, Jun. 15, 1991.
J. Richard Spears et al., "Potential Intravascular Oxygenation with Oxygen Clathrate Hydrate," (Abstract 388), Abstracts From the 65th Scientific Sessions, Circulation, vol. 80, Suppl. I, pp. I-97, 1992.
Brian A. Cason et al., "Effects of High Arterial Oxygen Tension on Function, Blood Flow Distribution, and Metabolism in Ischemic Myocardium," Circulation, vol. 85, No. 2, pp. 828-838, Feb. 1992.
Germano DiSciascio et al., "Reduction of Ischemia With a New Flow-Adjustable Hemoperfusion Pump During Coronary Angioplasty," American College of Cardiology, vol. 19, No. 3, pp. 657-662, Mar. 1, 1992.
"CORFLO™ Active Perfusion System for Coronary Angioplasty," Leocor, Inc., Houston, Texas, 1993.
Taijiro Sueda et al., "Evaluation of Two New Liquid—Liquid Oxygenators," ASAIO Journal, pp. 923-928, 1993.
Howard P. Grill et al., "Hemoperfusion During Right Coronary Artery Angioplasty Causing High-Grade Heart Block," The American Journal of Cardiology, vol. 72, pp. 828-829, Oct. 1, 1993.
Ebo D. deMuinck et al., "Hemoperfusion during Coronary Angioplasty: First European Experience with a New Hemoperfusion Pump," Artificial Organs, vol. 18, No. 7, pp. 517-522, 1994.
JDS Gaylor et al., "Membrane oxygenators: influence of design on performance," Perfusion, vol. 9, No. 3, pp. 173-180, 1994.
Brian A. Cason et al., "Therapeutic Hyperoxia Diminishes Myocardial Stunning," J Card Surg, pp. 459-464, 1994.
Michael T. Snider et al., Small Intrapulmonary Artery Lung Prototypes: Design, Construction, and In Vitro Water Testing, ASAIO Journal, pp. M533-M539, 1994.
"Non-Invasive Air/Bubble & Liquid Detection," Introtek Bulletin, Edgewood, New York, Jan. 1994.
Terry G. Campbell, Changing Criteria for the Artificial Lung Historic Controls on the Technology of ECMO,: ASAIO Journal, vol. 40, No. 2, pp. 109-120, Apr.-Jun. 1994.
Steven N. Vaslef, et al., "Design and Evaluation of a New, Low Pressure Loss, Implantable Artificial Lung," ASAIO Journal, vol. 40, No. 3, pp. M522-M526, Jul.-Sep. 1994.
Christopher E. Brennen, "Cavitation and Bubble Dynamics," California Institute of Technology, Pasadena, California, pp. 1-33, 1995.
Ron Waksman, MD et al., "Endovascular Low-Dose Irradiation Inhibits Neointima Formation After Coronary Artery Balloon Injury In Swine, A Possible Role for Radiation Therapy in Restenosis Prevention," Circulation, vol. 91, No. 5, pp. 1533-1539, Mar. 1, 1995.

Philip D. Beckley, et al., "Comparison of the performance characteristics of three generations of membrane oxygenators: Univox®, Univox®Gold™ and SpiralGold™," Perfusion, vol. 11, No. 1, pp. 61-70, 1996.
J. Richard Spears et al., "Myocardial Protection With a Perfusion Guidewire During Balloon Angioplasty in a Canine Model," (Abstracts/Poster 1032-30), JACC, vol. 27, Suppl. A, p. 392A, Feb. 1996.
J. Richard Spears, "Advances in the Management of Respiratory Failure—Aqeous Preparations of Oxygen," American Society for Artifical Internal Organs, Inc., vol. 42, No. 3, May-Jun. 1996.
Ron Waksman, MD, "Local Catheter-Based Intracoronary Radiation Therapy for Restenosis," Am J. Cardiol, vol. 78 (3A), pp. 23-28, Aug. 14, 1996.
Kane M. High et al., "Polysulfone Coating for Hollow Fiber Artificial Lungs Operated at Hypobaric and Hyperbaric Pressures," ASAIO Journal, vol. 42, No. 5, pp. M442-M445, Sep.-Oct. 1996.
J. Richard Spears et al., "Hyperoxemic Perfusion with Aqueous Oxygen Improves LV Function During Experimental MI-Reperfusion," (Abstract 2038), Circulation, vol. 96, Abstracts from the 70th Scientific Sessions, Supplement I, pp. I-364-I-365, 1997.
Richard Maas et al., "Superoxygenation Process Treats Highly Concentrated Wastewaters," WATER/Engineering & Management, pp. 29-33, 39, Feb. 1997.
J.R. Spears et al., "Intraaortic Infusion of Oxygen in a Rabbit Model," (Abstracts/Poster 1014-155), JACC, vol. 29, Sppl. A, pp. 317A-318A, Feb. 1997.
"22nd International Joint Conference on Stroke and Cerebral Circulation," Anaheim, California, Feb. 6-8, 1997.
K. Minami et al., "Pulsatile and nonpulsatile extracorporeal circulation using Capiox®E Terumo oxygenator: a comparison study with Ultrox® and Maxima® membrane oxygenators," The Journal of Cardiovascular Surgery, vol. 38, No. 3, pp. 227-232, Jun. 1997.
Adrian H. Shandling et al., "Hyperbaric oxygen and thrombolysis in myocardial infarction: The "Hot MI" Pilot Study," American Heart Journal, vol. 134, No. 3, pp. 544-550, Sep. 1997.
J. Richard Spears et al. Aqueous Oxygen—A Highly $O_2$-Supersaturated Infusate for Hyperoxemic Treatment of Postischemic Myocardium, (Abstract/Poster TCT-262), The American Journal of Cardiology, Sep. 1997.
Yoshinari Niimi et al, "Effects of Ultrathin Silicone Coating of Porous Membrane on Gas Transfer and Hemolytic Perfomance," Artificial Organs, vol. 21, No. 10, pp. 1082-1086, Oct. 1997.
Jose A. Condado, "Basis of endovascular radiation therapy in human coronary arteries," Seminars in Interventional Cardiology, vol. 2, No. 2, pp. 115-118, Nov. 12, 1997.
J. Richard Spears et al., "Aqueous Oxygen—A Highly $O_2$-Supersaturated Infusate for Regional Correction of Hypoxemia and Production of Hyperoxemia," Circulation, vol. 96, No. 12, pp. 4385-4391, Dec. 16, 1997.
G.J. Brereton et al., "Nucleation in small capillary tubes," Chemical Physics 230, pp. 253-265, 1998.
David W. Fried, et al., "Clinical oxygen transfer comparison of the Terumo Capiox SX18 and SX25 membrane oxygenators," Perfusion, vol. 13, No. 2, pp. 119-127, 1998.
Edited by Ron Waksman et al., "Handbook of Vascular Brachytherapy," The Livery House, London, pp. 1-131, 1998.
J.R. Spears et al., "Hyperoxemic Reperfusion With Aqueous Oxygen Improves Left Ventricular Function and Microvascular Flow in the Postischemic Canine Myocardium," (Abstract 1185-127), JACC, vol. 31 (Suppl. A) p. 449A, Feb. 1998.
Cassandra Henney et al., "Post MI Aqueous Oxygen Hyperoxemic Coronary Reperfusion Acutely Improves Canine LV Function Compared to Normoxemic Reperfusion," (Abstracts/Poster TCT-277), Amer. J. Cardiology, p. 100S, Oct. 8, 1998.
J. Richard Spears et al., "Subselective Intracoronary Aqueous Oxygen Hyperoxemic Reperfusion After One Hour Coronary Occlusion in Swine Restores Left Ventricular Function," (Abstracts/Poster 1124-165), JACC, vol. 33, Suppl. A, pp. 357A, Feb. 1999.
Product Monograph, Fluosol® 20% Intravascular Perfluorochemical Emulsion, "Delivers Oxygen to Protect the Heart During PTCA," Alpha Therapeutic Corporation, pp. 3-30.
Katzen™ Infusion Wires Product Description, (Rev. 3/91).

J. Richard Spears, Preliminary Studies (Low oxygen yield system: oxygen-supersaturated $D_5W$), PHS 398, pp. 50-51, (Rev. 9/91). (Was This Published???).

R. Snyder et al., "Percutaneous Transluminal Coronary Angioplasty with Hemoperfusion," Leocor Inc., Houston, Texas, pp. M367-M368.

J. Richard Spears, "Stabilization of Oxygen-Supersaturated Water During Capillary Injection Into Aqueous Media," Cardiovascular Laser Laboratory, Wayne State University School of Medicine, Detroit, Michigan, pp. 1-20. (Was This Published???).

Robert E. Apfel, "The Tensile Strength of Liquids," pp. 58-71.

"Artificial Lungs," pp. 55-60.

H. Lawrence Clever et al., "The Solubility of Gases in Liquids," Techniques of Chemistry, "Solutions And Solubilities," vol. VIII, Chapter VII, Part I, pp. 379-441.

E. Newton Harvey et al., "Bubble Formation In Animals," J. Cell. Comp. Physiol., vol. 24, pp. 23-34.

William Patterson et al., "A Liquid Oxygenator Salvages Myocardial Tissue by Delivering Hyperbaric Levels of Oxygen and by Reducing Neutrophil Accumulation," San Diego CREF Conference (Abstract/Poster Presentation), 12 pages, Feb. 10, 2000.

* cited by examiner

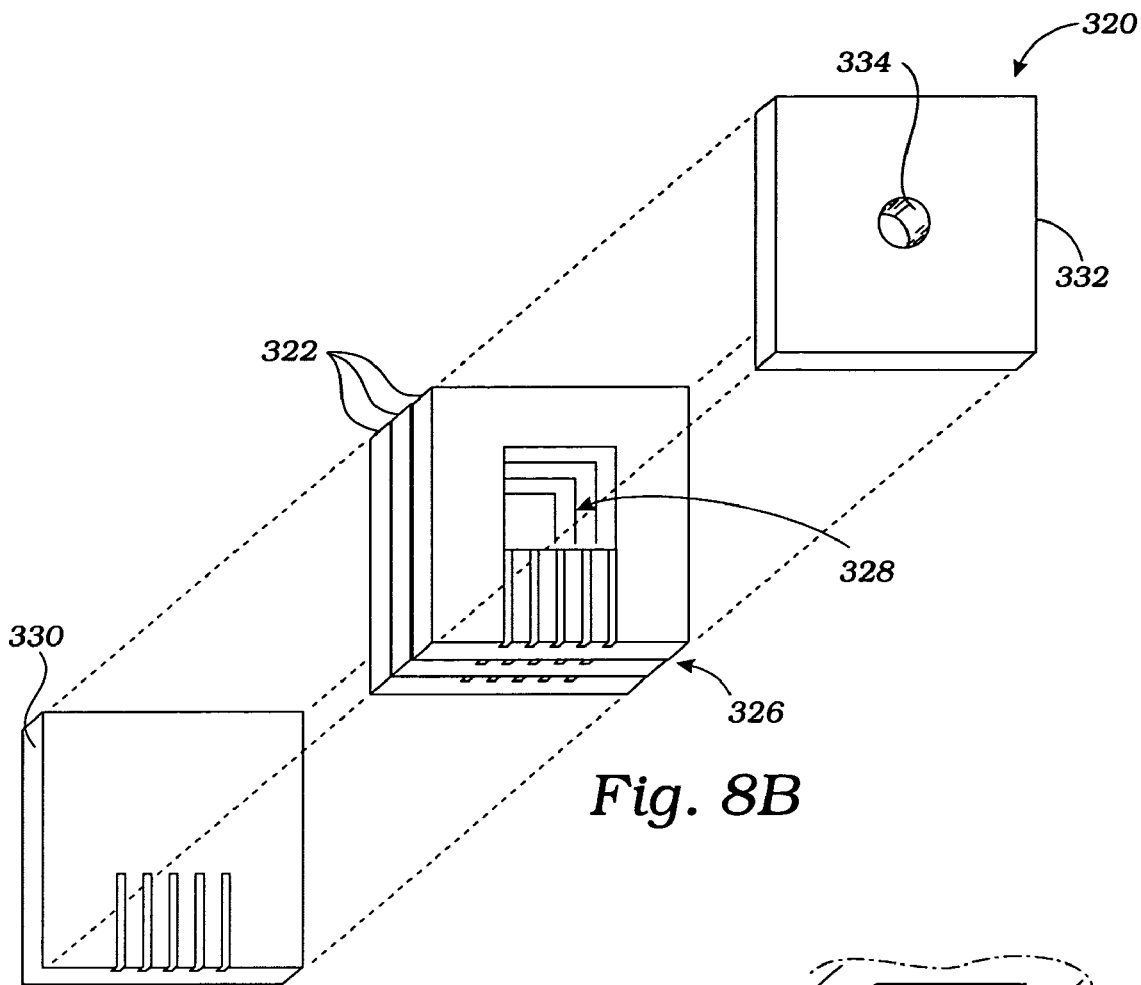
*Fig. 8B*
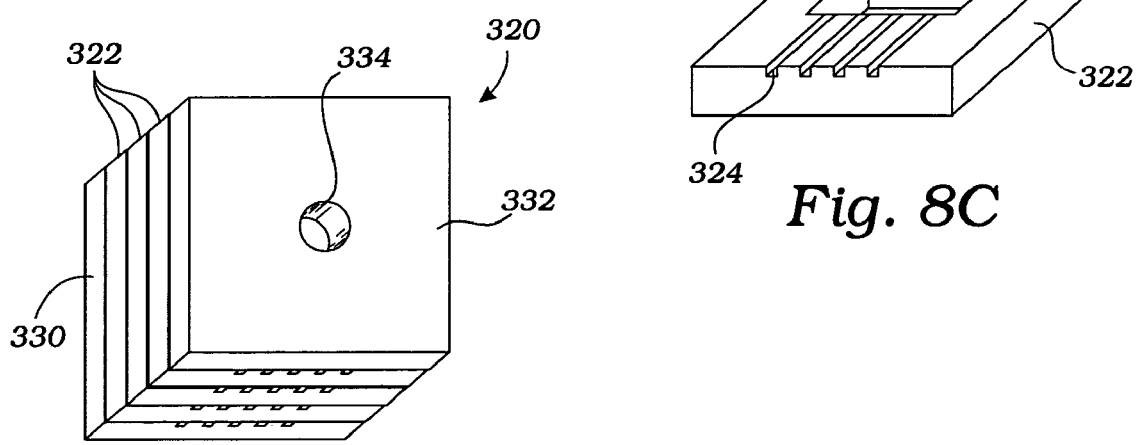
*Fig. 8C*
*Fig. 8A*

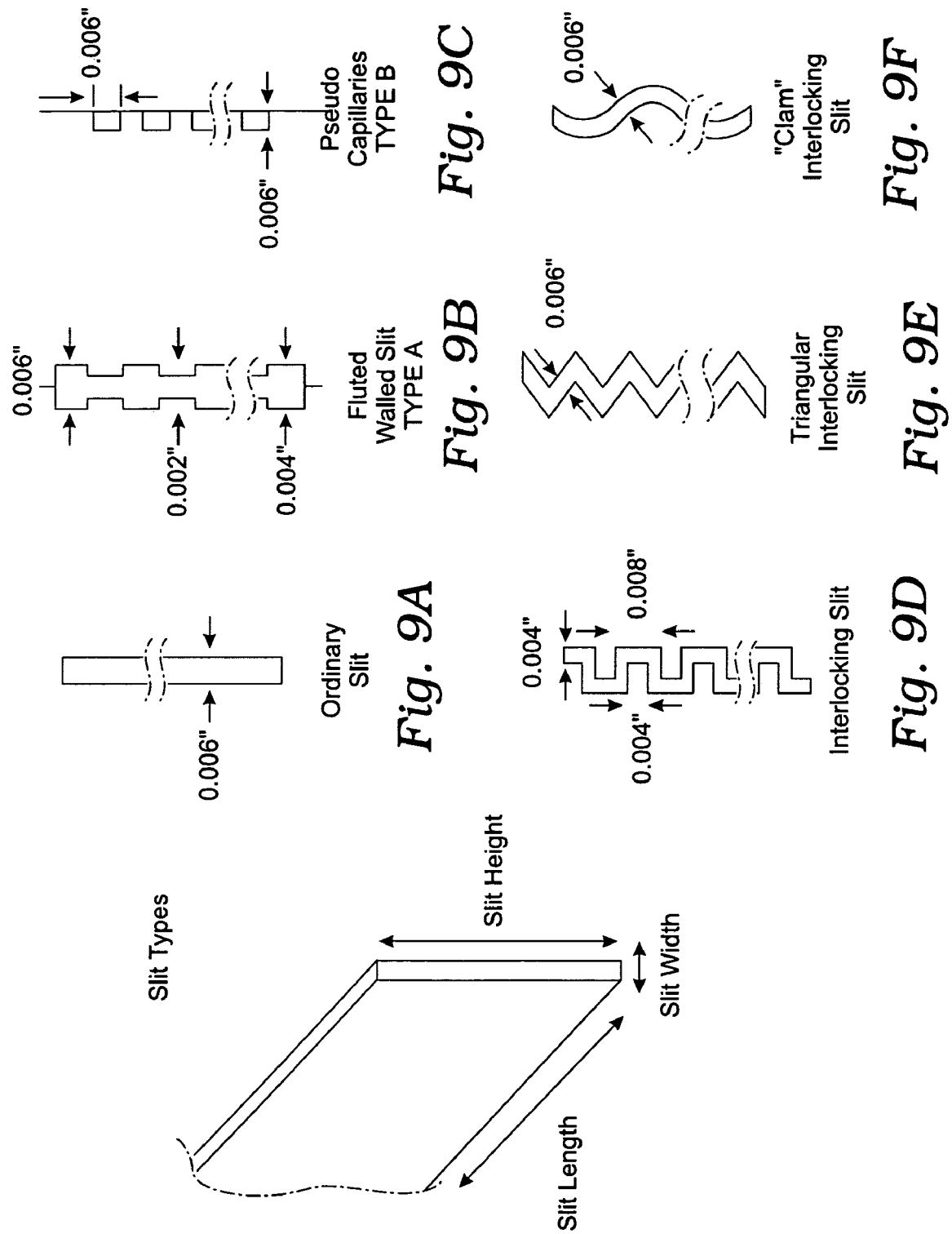

METHOD FOR OXYGENATING WASTEWATER

CROSS-REFERENCE TO THE RELATED APPLICATION

This application is a divisional of U.S. patent application Ser. No. 09/632,530, filed Aug. 4, 2000, now U.S. Pat. No. 7,008,535.

FIELD OF THE INVENTION

The present invention relates generally to a system and method for gas-enriching water and, more particularly, to a system and method for providing large volumes of oxygen-enriched water to a reservoir, tank, pond, stream, etc. to help meet its biochemical oxygen demand.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Any natural waterway has the ability to assimilate organic matter. When the loading of organic matter exceeds this assimilative capacity, the water resource is impaired for this reason. Waste, whether human or industrial, is treated for safe release into the environment. For example, wastewater from municipalities and industry is treated before discharge into waterways such as rivers. In many cases, these treatments accelerate the natural assimilation process by introducing additional oxygen to the biological process of degrading the waste.

Pollution, or contamination, of water is a serious problem throughout the world, particularly in the United States. Various sources of contamination are responsible for water pollution, including industrial and municipal entities. Industrial entities may discharge liquid or two-phase (liquid/solid) waste indirectly or directly into the environment, such as into rivers and lakes, contaminating the water supply and harming the environment, fish and wildlife. Air pollution is also a problem, particularly industrial air pollution, because airborne contaminants may be collected by rainfall and runoff into bodies of water. Industrial waste may include heavy metals, hydrocarbons, generally toxic materials, and many other known and unknown contaminants. In addition, wastewater and air pollution typically emit an undesirable odor from the contaminants, which may be a result of insufficient wastewater treatment or inefficient industrial systems (e.g., inefficient combustion, chemical reactions or processes, etc.) creating such contaminants.

Municipalities also produce considerable waste. Particularly, combined sewer overflows (CSOs), sanitary sewer overflows (SSOs), and stormwater discharges can create significant problems. Sewage carries bacteria, viruses, protozoa (parasitic organisms), helminths (intestinal worms), and bioaerosols (inhalable molds and fungi) among many other contaminants. Combined sewers are remnants of early sewage systems, which use a common pipe to collect both storm water runoff and sanitary sewage. During periods of rainfall or snowmelt, these combined sewers are designed to overflow directly into nearby streams, rivers, lakes or estuaries. SSOs are discharges of sewage from a separate sanitary sewer collection system, which may overflow prior to reaching a sewage treatment plant. Sanitary sewers may overflow for a variety of reasons, such as inadequate or deteriorating systems, broken or leaky pipes, and/or excessive rain or snowfall infiltrating leaky pipes through the ground. Finally, storm water runoff adds to the problem, as pollutants are collected en route to rivers, streams, lakes, or into combined and sanitary sewers. Storm water picks up contaminants from fertilizers, pesticides, oil and grease from automobiles, exhaust residue, air pollution fallout, bacteria from animals, decayed vegetation, and many other known and unknown contaminants.

Water contamination may be site specific, as with many industrial entities, or it may be non-site specific as with many CSOs, SSOs, and storm water runoffs. Although the discussion has been limited to industrial and municipal waste, contamination may arise from a variety of sources and accumulate in various site specific and non-site specific locations. For example, agricultural waste, pesticides and fertilizers create site specific water contamination, such as in ponds, streams, irrigation, ground water and drinking water for the animals and people.

Today, the most common waste treatment method is aerobic biological degradation, which uses microorganisms, commonly referred to as "bugs," to biodegrade waste. In a wastewater treatment application, aerobic biological degradation typically involves an aeration/activated sludge process in which oxygen is added to one or more tanks containing the wastewater to be treated. The oxygen supports the microorganisms while they degrade the compounds in the wastewater. To enable the microorganisms to grow and degrade the waste and, ultimately, to reduce the biochemical oxygen demand (BOD), i.e., the amount of oxygen required by microorganisms during stabilization of decomposable organic matter under aerobic conditions, in the treatment system, sufficient oxygen must be available. In some systems, additional oxygen is required to also reduce nitrogen levels in the effluent.

Typically, waste treatment plants use mechanical or diffuse aerators to support the growth of microorganisms. Mechanical aerators typically employ a blade or propeller placed just beneath the surface of a pond, tank, or other reservoir to induce air into the wastewater by mixing. Such mixers generally have relatively low initial capital costs, but often require substantial amounts of energy to operate.

Alternatively, diffused aerators introduce air or oxygen into wastewater by blowing gas bubbles into the reservoir, typically near its bottom. Diffused aerators, depending upon design, may produce either coarse or fine bubbles. Coarse bubbles are produced through a diffuser with larger holes and typically range in size from 4 to 6 mm in diameter or larger. Fine bubbles, on the other hand, are produced through a diffusers with smaller holes and typically range in size from 0.5 to 2 mm in diameter. Diffused aerators typically have lower initial costs, as well as lower operating and maintenance costs, than mechanical aerators.

Mechanical and diffused aerators involve driving off volatile organic compounds (VOC's) and contributing to odor issues while transferring oxygen in a gaseous state into liquid wastewater, with oxygen transfer occurring mainly as a result of diffusion across the gas-liquid boundary. For example, in the case of diffused aerators using pure oxygen, the gas-liquid boundary is defined by the outer surfaces of the air bubbles introduced into the treatment site. Generally, fine bubble aerators are more efficient than coarse bubble and mechanical aerators due to the increased total surface area available for oxygen transfer that is associated with the fine bubbles. The performance of fine bubble aeration degrades over time if regular maintenance is not used.

However, more efficient apparatus and methods for oxygenating wastewater still are needed. Municipal wastewater needs typically grow as the municipality grows in population. To meet increasing needs, municipalities either expand existing wastewater treatment facilities or build additional wastewater treatment facilities. Either option requires additional land and new equipment. Thus, much expense may be saved by enhancing the operating efficiency of existing facilities in response to increased demand for wastewater treatment.

A municipal wastewater treatment process, for example, typically involves a primary treatment process, which generally includes an initial screening and clarification, followed by a biological treatment process, sometimes referred to as a secondary treatment process. The wastewater entering the activated sludge process may have about sixty percent of suspended solids, thirty percent of BOD, and about fifty percent of pathogens removed in the primary treatment (although in some processes primary clarification may be omitted so that the solids otherwise removed are available for food for the microorganisms working in the secondary process).

The activated sludge process typically consists of one or more aeration tanks or basins in which oxygen is added to fuel the microorganisms degrading the organic compounds. After leaving the aeration tank(s) the water enters a secondary clarifier in which the activated sludge/microorganisms settle out. After passing through this activated sludge process the water typically has about 90% of the suspended solids and 80-90% of the BOD removed. The water is ready for either more advanced secondary or tertiary treatments, or for return to a natural waterway. The choice typically depends upon the effluent levels and local regulations.

Alternately, wastewater treatment may occur in a sequencing batch reactor (SBR). SBR treatment generally is the same as an activated sludge system, except that the process is performed in only one tank, whereas activated sludge systems may use several tanks. SBRs may be used as an alternative to an activated sludge process, in regular secondary treatment, or for more advanced treatment processes, e.g., nitrification/denitrification and phosphorus removal. SBRs may process numerous batches per day. Typically, for industrial applications SBRs process one to three batches per day, whereas for municipal applications SBRs may process four to eight batches per day.

The operation of an SBR generally includes five separate phases: fill, react, settle, decant, and idle, although there may be alternatives to these SBR phases depending upon the circumstances involved in a particular application. In the fill phase, wastewater enters the reactor tank through a port near the bottom of the basin, after which the inlet valve is closed. Aeration and mixing may begin during the fill. In the react phase, the inlet is closed and aeration and mixing continues or begins. In the settle phase, the remaining solids settle to the bottom of the basin. In the decant phase, fluid is removed from the surface of the basin by a decanter. During this time settled sludge also may be removed. In the idle phase, the reactor awaits a new batch of wastewater, typically with a portion of the biomass remaining in the basin to provide food for the microorganisms in the next batch.

The owners and operators of wastewater treatment plants often search for ways to lower the cost of remaining in compliance with local, state, and/or federal laws regulating such plants. One way of lower operating costs has been to pursue energy conservation measures to achieve lower operating and maintenance costs. One particular target has been the substantial electricity and other energy costs associated with the operation of conventional systems for aerating wastewater. Aeration can account for more than half of municipal wastewater treatment energy consumption. However, despite past focus on improving oxygen delivery systems to deliver higher levels of oxygen into wastewater more efficiently, there remains a need for further improvement, i.e., an apparatus and method for delivering large quantities of oxygen in conjunction with wastewater treatment applications. Furthermore, a flexible waste treatment apparatus and method is needed to adequately address non-site specific water pollution, for example, in stream water pollution resulting from CSOs, SSOs and storm water runoff, and special and/or smaller applications such wastewater and odor control on farms.

SUMMARY OF THE INVENTION

The present invention may address one or more of the problems set forth above. Certain possible aspects of the present invention are set forth below as examples. It should be understood that these aspects are presented merely to provide the reader with a brief summary of certain forms the invention might take and that these aspects are not intended to limit the scope of the invention. Indeed, the invention may encompass a variety of aspects that may not be set forth below.

A system is provided for transferring gas into fluids. In one embodiment, the system is an assembly for delivering oxygen into wastewater. The system includes an oxygenation assembly including a pressurizable chamber that receives water from a fluid supply assembly and oxygen gas from an oxygen gas supply assembly. Advantageously, the oxygen gas supplied pressurizes and maintains the chamber at a pressure greater than atmospheric pressure (e.g., 300 p.s.i.). The water advantageously enters the chamber through an atomizer nozzle that forms water droplets within the chamber. As the water droplets fall within the chamber, oxygen diffuses into the droplets, which collect as a pool of oxygen-enriched water at the bottom of the chamber. The oxygen-enriched water is removed from the chamber and delivered via a hose to a treatment site.

It should be understood that the water to be oxygen-enriched may be relatively clean water from a water supply, such as a tank, pond, lake, stream, or river. Once this relatively clean water is oxygen-enriched, it may be added to the wastewater to raise the oxygen level of the wastewater. Alternatively, the water to be oxygen-enriched may be wastewater skimmed from the treatment tank. The skimmed wastewater is filtered to prevent the system from clogging, and the filtered wastewater is then oxygen-enriched and returned to the wastewater tank to raise the oxygen level of the wastewater in the tank.

Advantageously, the distal end of the hose includes or is coupled to a delivery nozzle including one or more capillaries through which the oxygen-enriched water effluent passes. The capillaries may be dimensioned to an appropriate length and diameter for a desired flow rate, oxygen concentration, and other flow characteristics such as substantially laminar and bubble free flow. The capillaries are advantageously made of silica, and may be dimensioned to a length of about 6 cm and an internal diameter of about 150 to 450 microns. Alternatively, the capillaries may be constructed from a variety of metals, metal alloys, glasses, plastics/polymers, ceramics or other suitable materials. For an oxygen-enriched water flow rate of about 1.5 gal/min, at about 300 p.s.i., a delivery nozzle including approximately 450 such capillaries is particularly advantageous. The capillaries tend to stabilize the gas-enriched water during its delivery into host liquids at ambient pressure. As a result, nucleation and bubble formation in the effluent, during ejection from the capillary and mixing with the host liquid, is minimal or absent despite potentially high gas partial pressures of the oxygen dissolved in the effluent. An extremely high oxygen transfer efficiency, approaching or even equaling 100 percent, is thereby achievable with this approach for oxygenating host liquids such as wastewater.

Alternately, the oxygen-enriched water is delivered to a treatment site via a hose coupled to a plate-based delivery nozzle system. The plate-based nozzle includes one or more plates having a plurality of channels formed therein. The cross-sectional profile of the channels may be a variety of shapes, e.g., circular, square, rectangular, oval, triangular, etc. Advantageously, the channels in each plate extend along a portion of the top surface of the plate from a hole in the plate (which advantageously extends between the top and bottom surfaces of the plate) to the plate's edge. The plates are disposed on top of one another such that the bottom surface of one plate is mated to the top surface of an adjacent plate to create fluid pathways between adjacent plates. Further, by placing a bottom plate without a hole beneath a stack of plates, and by placing a top plate including a port adapted to couple to the hose on top of the stack, a plenum is formed within the stack to receive the oxygen-enriched water from the hose and to provide oxygen-enriched water to each of the fluid pathways for delivery to the treatment site.

Depending upon the circumstances involved in a particular application, a number of different geometries may be used for the plate-based nozzle system. The plates may be of any suitable size or shape, depending upon the application involved. The channels may extend in each plate to any of the sides of the plate, so that oxygen-enriched water may be delivered in any direction. Further, adjacent surfaces of two plates may have channels formed therein, so as to create a desired fluid pathway geometry when the plate surfaces are brought together, e.g., by alignment of the channels on two separate plates.

An alternate embodiment of the plate-based delivery nozzle system may employ one or more conical plates to create an annular array of fluid pathways. The conical plates have a plurality of channels, which extend linearly along an inner or outer surface between a small and broad end of the conical plates. The conical plates stack in series such that the outer surface of one conical plate is disposed within the inner surface of another conical plate, thereby creating an annular array of fluid pathways between adjacent conical plates. The conical plates are then truncated at one end to provide a common entry position for the oxygen-enriched water and are configured such that the opposite end forms a desired exit surface (i.e., conical, concave, flat, etc.). The conical plate design may advantageously simplify assembly, as the oxygen-enriched water flow forces the conical plates together during use, and may simplify cleaning, as reversed water flow may be used to separate and clean the conical plates.

By placing one or more delivery nozzles at a treatment site, oxygen levels at the site advantageously may be maintained or increased by delivering oxygen-enriched water to the site. For example, in a wastewater treatment reactor, oxygen-enriched water may be added to the reactor contents to help support biological degradation activity, reduce biochemical oxygen demand, etc. Advantageously, the water used to supply the oxygen-enriched fluid supply system is filtered to minimize the risk of the delivery nozzle becoming clogged by particulate matter. The water used to supply the system may come from any source, e.g., a municipal water source; a river, lake, or other reservoir; the treated water effluent of a wastewater treatment operation; the supply of wastewater to be treated, etc.

Because much of the oxygen provided to a treatment site is in the form of oxygen-enriched water having high levels of dissolved oxygen, oxygenation of the site occurs rapidly as the oxygen-enriched water mixes with the wastewater. Advantageously, delivery of the oxygen-enriched water occurs with minimal bubble formation, so oxygenation efficiencies are achieved which surpass the efficiencies obtainable with commercially available aerators. Thus, the system provided advantageously may be used either to replace or to supplement conventional aeration equipment.

BRIEF DESCRIPTION OF THE DRAWINGS

Further objects and advantages of the present invention may become apparent upon reading the following detailed description and upon referring to the accompanying drawings in which:

FIGS. 8A-E illustrate another alternative embodiment of a gas-enriched fluid delivery nozzle, particularly illustrating a plate-based nozzle.

FIGS. 9A-F illustrate exemplary channel geometries that may be used in conjunction with a plate-based nozzle, such as the nozzle shown in FIGS. 8A-E.

DETAILED DESCRIPTION OF SPECIFIC EMBODIMENTS

The description below illustrates certain specific embodiments or forms that depict various aspects of the present invention. For the sake of clarity, not all features of an actual implementation are described in this specification. It should be appreciated that in connection with developing any actual embodiment of the present invention many application-specific decisions must be made to achieve specific goals, which may vary from one application to another. Further, it should be appreciated that any such development effort might be complex and time-consuming, but would still be routine for those of ordinary skill in the art having the benefit of this disclosure.

For the sake of clarity and convenience, the various embodiments are described herein in the context of applications generally involving municipal wastewater treatment, including treatment of CSOs, SSOs, and storm water discharges. However, the present invention may also be useful in other applications, such as industrial wastewater treatment, e.g., in the petroleum, food, pulp and paper, and steel industries; lake and stream restoration and/or wastewater treatment; chemical wastewater treatment; landfill wastewater treatment; ground water treatment; drinking water disinfection with ozone; agricultural or aquacultural water treatment; odor control (e.g., on farms); etc. Also, although the present system may be used to raise gas levels, such as oxygen for example, in water or other fluids, for the sake of clarity and convenience reference is made herein only to wastewater applications.

It should be understood that the gas supplied by the gas supply assembly described below may include oxygen, ozone, carbon monoxide, carbon dioxide, hydrogen, nitrogen, air, chorine gas, and/or other treatment gases, while the gas-enriching assembly described below advantageously includes a gas-absorption assembly capable of raising the dissolved gas content of the fluid provided by the fluid supply assembly described below. However, again for the sake of clarity and conciseness, the use of oxygen gas will be primarily discussed herein by way of example.

Figure 1:
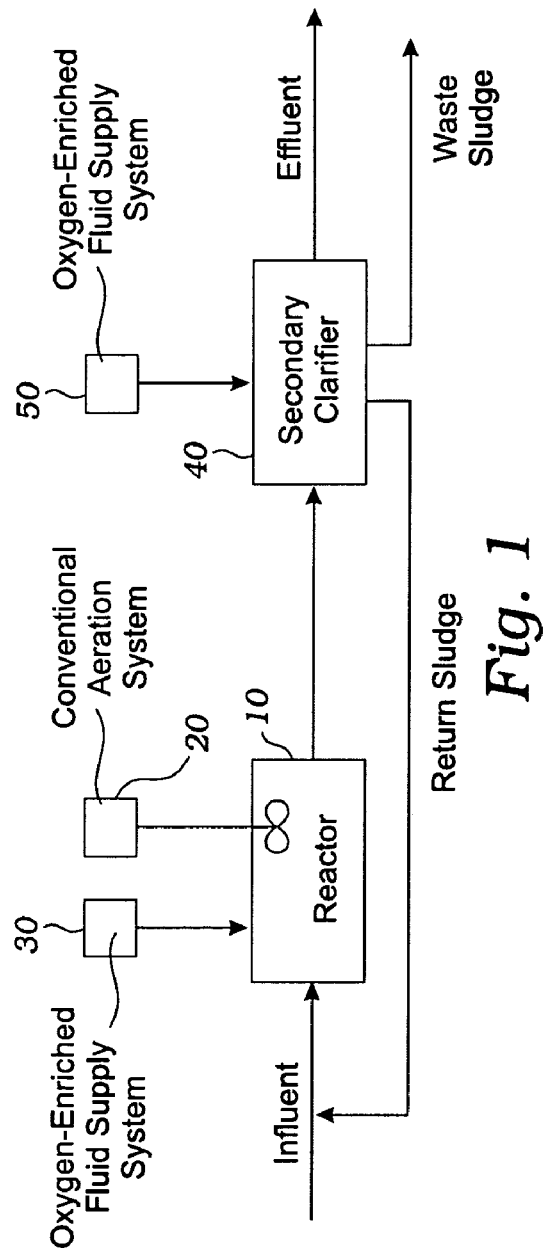
FIG. 1 is a schematic diagram illustrating an exemplary embodiment of a system for oxygenating wastewater including an oxygen-enriched fluid supply system in accordance with the present invention.

Turning now to the drawings, a wastewater treatment system is provided in which, as shown in FIG. 1, wastewater influent is delivered to a reactor 10 for primary treatment. Advantageously, the wastewater includes microorganisms for carrying out an aerobic biological degradation process. To support microorganism activity, the wastewater is oxygenated. To provide such oxygenation, a conventional aeration system 20, e.g., a mixer or diffuser, and an oxygen-enriched fluid supply system 30 are illustrated, although it should be understood that the fluid supply system 30 may be used alone or in conjunction with the conventional aeration system 20. Advantageously, the system 30 or the systems 20 and 30 are operated to meet the BOD for the reactor 10. After an initial screening and clarification, wastewater from the reactor 10 is typically transferred to a secondary clarifier 40 for further treatment. A second oxygen-enriched fluid supply system 50 may be used, again either alone or in conjunction with a conventional aeration system (not shown in FIG. 1), to raise or maintain oxygen levels in the clarifier 40 to support microorganism activity. After sufficient processing to achieve predetermined levels of suspended solids and BOD, supernatant treated water is removed as an effluent and all or a portion of the settled waste sludge is removed for disposal, with any remaining sludge returned to the reactor 10 to join a new batch of influent for treatment.

Figure 2:
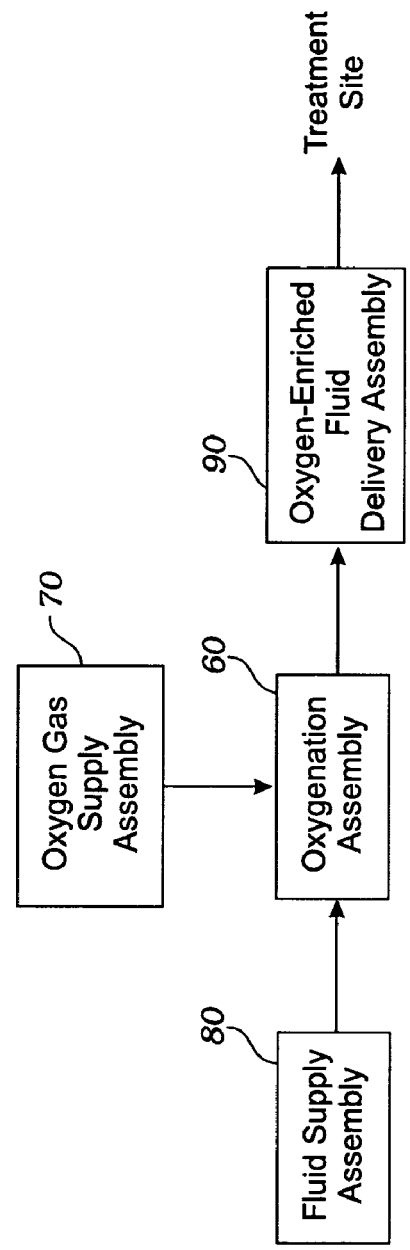
FIG. 2 is a schematic diagram illustrating an exemplary embodiment of an oxygen-enriched fluid supply system in accordance with the present invention.

As shown in FIG. 2, one exemplary embodiment of an oxygen-enriched fluid supply system 30 includes a gas-enriching assembly, such as an oxygenation assembly 60, operatively coupled to both a gas supply assembly, such as an oxygen gas supply assembly 70, and a fluid supply assembly 80. The oxygenation assembly 60 advantageously includes an oxygen absorption assembly capable of raising the dissolved oxygen content of the fluid provided by the supply assembly 80. The oxygen-enriched fluid exiting the oxygenation assembly 60 advantageously is provided to an oxygen-enriched fluid delivery assembly 90 for transfer to a predetermined treatment site.

Dissolved oxygen levels of the fluid may be described in various ways. For example, dissolved oxygen levels may be described in terms of the concentration of oxygen that would be achieved in a saturated solution at a given partial pressure of oxygen ($pO_2$). Alternatively, dissolved oxygen levels may be described in terms of milligrams of oxygen per liter of fluid or in terms of parts per million of oxygen in the fluid.

Figure 3:
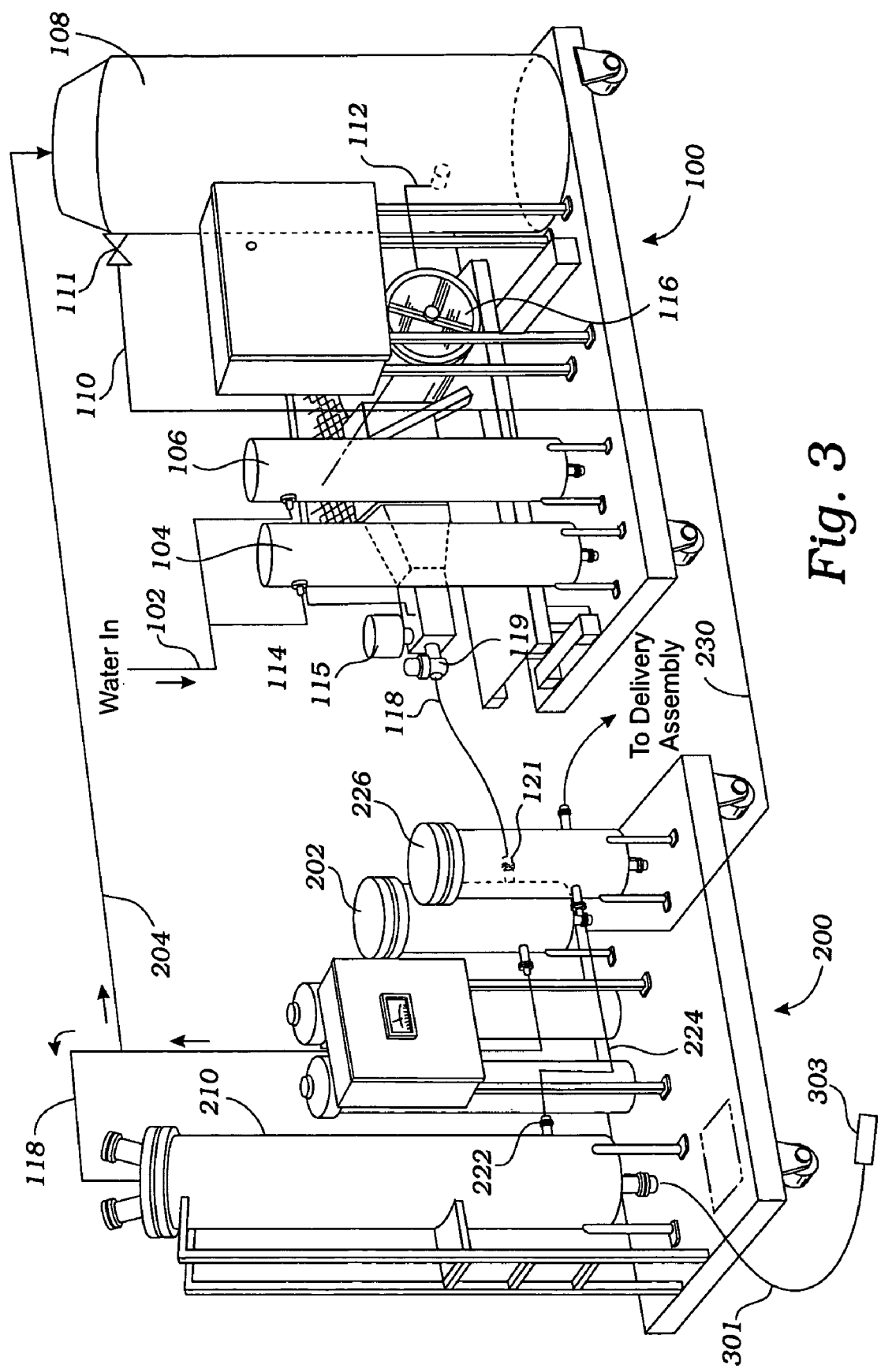
FIG. 3 is a view of an exemplary embodiment of an oxygen-enriched fluid supply system including an exemplary fluid supply cart and an exemplary oxygenation cart in accordance with the present invention.

As shown in FIG. 3, one currently assembled embodiment of an oxygen-enriched fluid supply assembly 30 includes a fluid supply cart 100 operatively coupled to an oxygenation cart 200. The carts 100 and 200 support various respective components of the system 30 and demonstrate that the system 30 may be small enough to be mobile. Of course, the actual size of the system 30 and the mobility or lack thereof of the system 30 will depend primarily upon the requirements of a given implementation. For example, if the system 30 were to be used as the sole means for aerating a reactor 10 in a municipal wastewater facility, it would likely be embodied as a fixture at the site. However, if the system 30 were to be used for aerating ponds or as a supplemental aerator in an industrial or municipal wastewater facility, it may be advantageous to mount the various components of the system 30 on a moveable cart or plat, or even on a trailer or vehicle (not shown).

Water is provided to the fluid supply cart 100 at via line 102 from a source, e.g., the reactor tank 10, a holding tank, a municipal water supply line, etc., or by a pump withdrawing the water from a tank, pond, stream, or other source. Advantageously, for an application involving wastewater treatment, the water is input at a rate of between about 5 and about 200 gallons per minute, although the input rate may be higher or lower depending upon the application. More specifically, a rate of about 60 gallons per minute may prove to be particularly advantageous for many applications. The provided water advantageously is filtered to remove solid particulate. To provide this function, one or more filters, such as the filters 104 and 106, are coupled to the line 102. It should be understood that multiple filters may be coupled in series or in parallel depending upon the circumstances involved in a particular application. As discussed below, a series of filters may be used to remove particulate matter from the incoming water effectively. It may also be advantageous to couple filters or sets of filters in parallel so that one or more filters can be serviced without stopping the treatment process.

In a wastewater treatment application, at least one filter (e.g., a 150 to 450 micron filter) may prove to be particularly advantageous, although it should be understood that the type and number of filters used may depend largely upon the source of the water to be oxygenated. For instance, if relatively clean water from a holding tank is to be oxygenated, a single filter, such as a 150 micron filter, may be sufficient to remove particulate matter. However, if wastewater is skimmed off of the reactor 10 and introduced into the system 30, additional filters, such as a coarse filter (e.g., 450 micron) and a medium filter (e.g., 300), may be used to remove large particulate matter before the partially filtered water is introduced to a relatively fine filter, such as a 150 micron filter. Examples of commercially available filters include sand filters, cartridge filters and bag filters, which may be self-flushing or may contain disposable elements such as cotton, plastic, metal or fiber filter elements. Also, the filter size is typically selected to be the same as or smaller than the capillaries used to deliver the oxygenated fluid.

As shown in FIG. 3, the filtered water advantageously is provided to a holding tank 108, e.g., a 300-gallon tank, via a line 110 that is coupled to the fluid exit ports of the filters 104 and 106. Advantageously, a valve 111, such as an electronic valve, is operatively coupled to the line 110 supplying the tank 108 to help control flow into the tank 108 based upon the level of water in the tank 108. Such control might occur, for example, in response to signals generated by one or more level sensors positioned for controlling the level of water in the tank 108, or by a load cell operatively linked to the tank 108. The tank 108 also may include high and low water sensors for safety shut-off.

Fluid exits the tank 108 through a primary line 112 (e.g., by gravity feed) to a pump 114 run by a motor 116. The pump 114 provides the fluid to the oxygenation cart 200 via a line 118. The fluid may be filtered before and after the pump 114 to remove additional particulate matter. As shown in FIG. 3, the line 118 includes a 150 micron filter 202 disposed on the oxygenation cart 200. In addition, the pump 114 may be operatively coupled to an assembly 115, such as an accumulator, for dampening the pulsatility created by the pump 114 so that the fluid is provided to the oxygenation cart 200 at a steady, continuous rate during pump operation.

The pump 114 can run continuously or intermittently, and can provide variable or constant flows, depending upon the circumstances involved in a particular application. One example of a particularly advantageous pump is the model #60AG6020 pump available commercially from CAT Pumps, Minneapolis, Minn. To regulate the amount of flow provided to the oxygenation cart 200 for oxygenation, the line 118 via which fluid is provided to the oxygenation cart 200 may include a modulating valve 119, such as an electronic valve, operable as needed to divert a predetermined portion of the flow via a bypass line 204 back to the tank 108. The oxygenation cart feed line 118 advantageously includes a check valve 121 to prevent unwanted flow of gas or liquid from the oxygenation cart back toward the pump 114 and tank 108.

The system also may include a flush line 230 between the tank and the delivery assembly which bypasses the oxygenation assembly. The flush line 230 allows water to pass to prevent dirty water from back flowing into the system when the oxygenation assembly is in stand-by mode. As shown in FIG. 3, the flush line 230 advantageously also may provide a fluid pathway between the lines 110 and 224.

Figure 4:
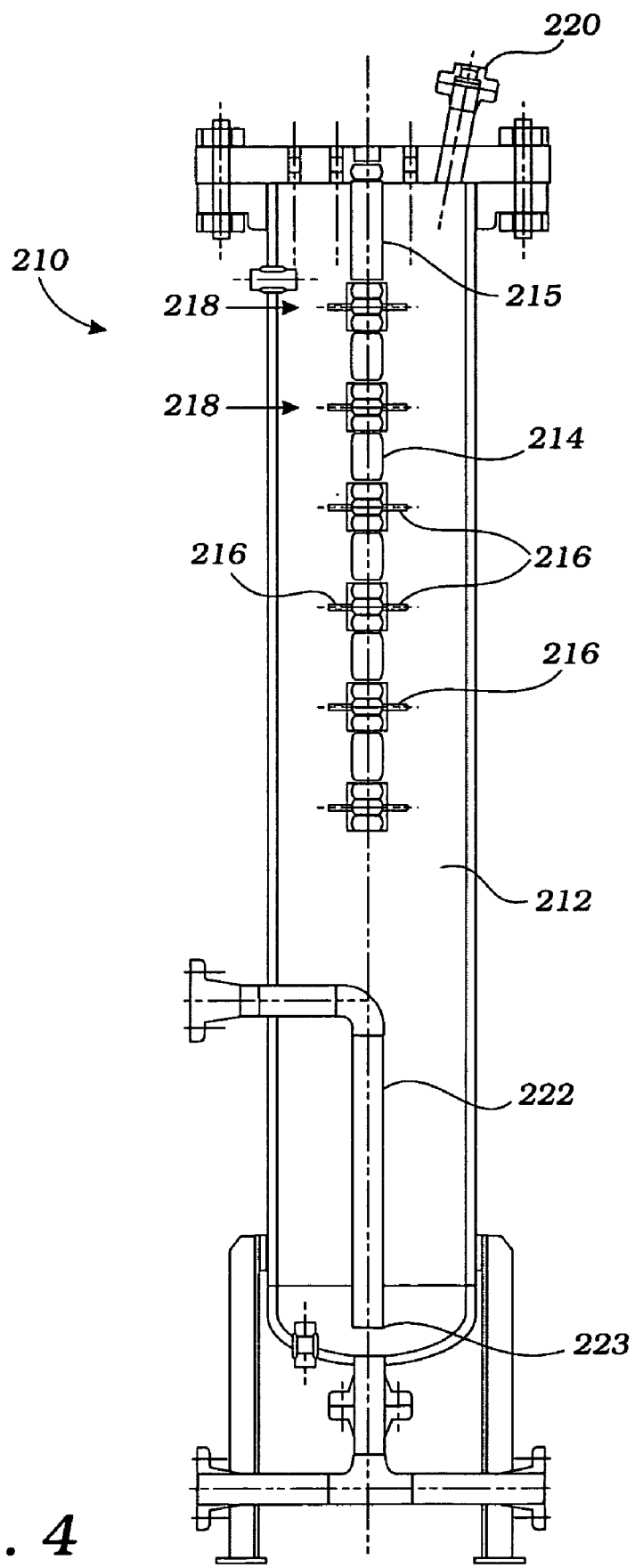
FIG. 4 is a cross-sectional view of an exemplary oxygenation assembly in accordance with the present invention.

The oxygenation cart 200 advantageously includes a pressurizable vessel 210 that has an interior space 212 in which water from the pump 114 and gas from a gas supply assembly (not shown) are provided. The water enters the vessel 210 from the feed line 118 via a cantilever-like "stinger" 214 (see FIG. 4) extending from the top of the vessel 210 into the interior space 212. The stinger 214 advantageously comprises a 1.5 inch pipe 215 about 3 feet in length having an inner lumen (not shown) in fluid communication with the feed line 118. The stinger 214 includes one or more nozzles 216 that form fluid ports through which fluid may exit the stinger's inner lumen and enter the interior space 212. In one embodiment, each nozzle takes the general form of a pig tail which winds to form a generally conical profile.

The stinger 214 includes one or more nozzle arrays 218 including a plurality of nozzles 216 arranged about the longitudinal axis of the stinger 214. In the disclosed embodiment, each nozzle array 218 includes six nozzles 216 equally circumferentially spaced about the longitudinal axis of the stinger 214. The stinger 214 may include a plurality of nozzle arrays 218 spaced along the longitudinal axis of the stinger 214. As shown in the embodiment illustrated in FIG. 4, the stinger 214 includes six arrays of six nozzles spaced about six inches apart along the stinger 214. Advantageously, the nozzles in the arrays may be circumferentially offset from each other to minimize any overlap in the fluid exit area of each nozzle. This minimizes interference between water droplets from adjacent nozzles and, thus, facilitates the production of smaller droplets to optimize gas transfer to the liquid. Alternatively, an umbrella (not shown) may be placed over one or more nozzle arrays to minimize interference between water droplets.

Each nozzle 216 advantageously comprises an atomizer nozzle. Any commercially available atomizer nozzle may be used depending on the circumstances involved in a particular application. One particularly advantageous nozzle is the Model TF6NN 3/16 stainless steel (0.25 inch npt) fog nozzle available from BETE Fog Nozzle, Greenfield, Mass. During operation, water exiting the nozzles 216 forms a spray of small droplets which contact the oxygen gas in the chamber. Oxygen dissolves in the droplets, which fall and collect in a pool at the bottom of the oxygenation assembly chamber. The pool advantageously is about two feet deep in a twelve-inch diameter chamber that is about six feet tall. Furthermore, the number and size of the nozzles are typically selected to provide a desired throughput. Indeed, should throughput parameters change, one or more valves (not shown) may be placed in the pipe 215 to selectively activate or deactivate one or more of the nozzle arrays.

The stinger 214 advantageously is removably insertable within the interior space 212. The stinger 214 may be secured in place for operation by fastening the inlet end to the top of the oxygenation assembly, e.g., with bolts or other fasteners. Removal may be advantageous to allow access to the interior of the oxygenation assembly 210 and to the stinger 214, e.g., to clean the nozzles, to replace nozzles or other parts, etc.

Oxygen is provided to the oxygenation assembly by a regulated source of oxygen. Advantageously, the oxygen gas is provided to the oxygenation assembly 210 at about 300 p.s.i. via a line which includes a valve regulating the flow through the line and a check valve that prevents unwanted back flows. The pressure and/or flow through the line may fluctuate with changes in the water level within the oxygenation assembly 210.

Water is provided to the oxygenation assembly 210 at a pressure greater than the pressure in the tank interior space 212—about 300 p.s.i. in this example. A steady state water supply pressure of about 340 p.s.i. may prove to be particularly advantageous for applications involving wastewater treatment, although pressure fluctuations commonly occur during operation of the system. Advantageously, the oxygenation assembly 210 includes one or more pressure gauges to allow monitoring and control of the pressures in the system. The oxygenation assembly 210 and other parts of the system further advantageously include one or more pressure relief valves to guard against unwanted pressure build-ups within the system.

In this embodiment, fluid exits the oxygenation assembly chamber through a dip tube 222 having an inlet end 224 positioned above the bottom of the chamber. By removing fluid from near the bottom of the chamber (as opposed to at the top), gas blow-by is avoided and no bulk gas exits the chamber. The dip tube 222 is connected to an output line 224 having a distal end coupled to a delivery assembly, so as to create a continuous fluid flow path between the pool in the chamber and the delivery assembly inlet. The output line 224 may include one or more valves, check valves, and/or filters. For example, as shown in FIG. 3, the line 224 includes a 150 micron filter 226.

Advantageously, the oxygenation assembly 210 also includes one or more windows or sight glasses 220 which allow an operator to view the interior of the oxygenation assembly 210 during operation. Visual monitoring may be performed, for example, to check the operation of the nozzles (e.g., to monitor fluid droplet sizes, check for plugging resulting in flow disruption, etc.), to check fluid levels, etc.

In this example, the fluid collecting at the bottom of the chamber has a dissolved gas content of about 880 ppm. This dissolved oxygen content represents an increase in oxygen content of about one hundred times as compared to the fluid entering the chamber before oxygenation. The dissolved gas concentration, along with the operating efficiency, costs, and flow characteristics of the system, may be widely varied according to the operating parameters (e.g., fluid and gas pressures) of the disclosed embodiments. For example, the apparatus could produce a dissolved gas content ranging from approximately 40 ppm to 8000 ppm for system pressures ranging between about 14.7 and 3000 p.s.i., depending on the given operating parameters and system limitations. It should also be pointed out, that lowering pressures within the system lowers the amount of dissolved gas content that is achievable, but the lower pressures also lower the cost of the system. For example, if the system pressures were lowered by about 200 p.s.i. from the 300 p.s.i. range to the 100 p.s.i. range, the dissolved gas content of the fluid would be about 275 ppm. In many applications, this oxygen-enriched fluid will be more than adequate to aerate the wastewater, while providing lower equipment and operating costs.

Figure 5:
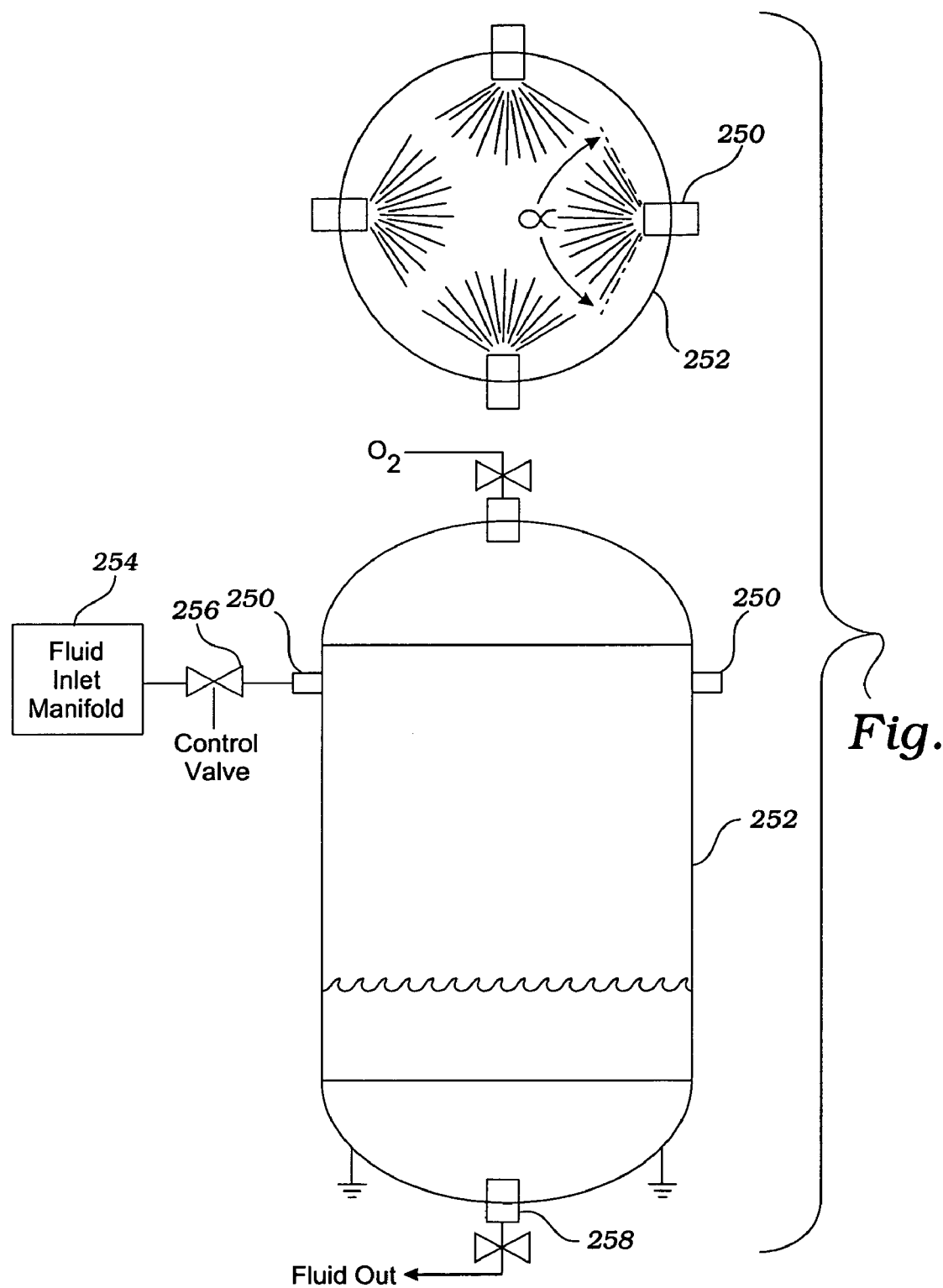
FIG. 5 is a cross-sectional view of an alternate exemplary oxygenation assembly in accordance with the present invention.

As one alternative configuration, the oxygenation assembly 60 may include a plurality of nozzles 250 disposed circumferentially about the wall of a tank 252, as illustrated in FIG. 5. Advantageously, the flow of fluid entering the tank 252, e.g., from a fluid inlet manifold 254, via the nozzles 250 is controlled by a valve 256 adjusted in response to signals generated by sensors (not shown) for detecting the level of water in the tank 252, or by a load cell (not shown) disposed beneath the tank 252. Oxygen from a regulated pressure source (not shown) enters the tank 252 at the top, and oxygen-enriched fluid is withdrawn via a fluid exit port 258 at or proximate the tank bottom. In an application including a tank about 5 feet high and 2 feet in diameter (a tank size of about 100 gallons), for fluid flow rates of about 15 gallons per minute, a system including four nozzles 250 capable of handling two to four gallons per minute and generating a droplet cone defined by an included angle α of about 90 degrees may prove to be particularly advantageous. For higher fluid flow rates, e.g., 60 gallons per minute, a system including eight nozzles for handling six to eight gallons per minute may be advantageous.

One embodiment of the oxygen-enriched fluid delivery assembly 90 may include one or more elongated hoses 301 (FIG. 3) having a proximal end including a fluid inlet coupled to the output of the tank of the oxygenation assembly 60 and a distal end including one or more fluid exit nozzles 303. The hose length may vary depending upon the circumstances involved in a particular application. Advantageously, the fluid exit nozzle 303 comprises a plurality of capillaries, channels, or slits forming continuous fluid pathways that are sized to maintain the oxygen dissolved in the fluid upon exit.

Figure 6:
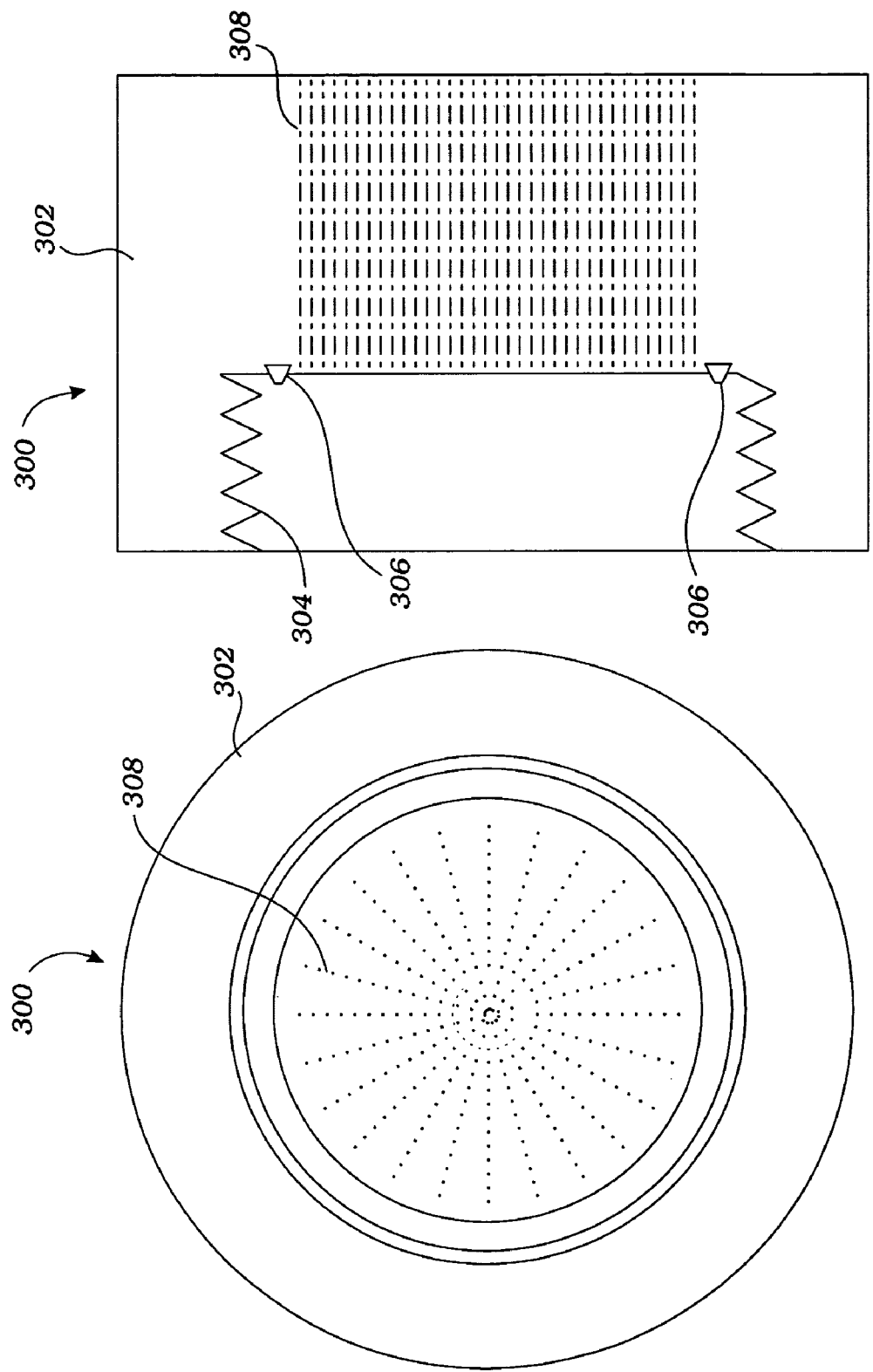
FIG. 6A is an end view of one embodiment of a gas-enriched fluid delivery nozzle.
FIG. 6B is a cross-sectional side view of the nozzle of FIG. 6A.

In one embodiment, as shown in FIG. 6A, the fluid exit nozzle 303 comprises a collar assembly 300 comprising a main body portion 302 adapted with a plurality of fluid exit pathways 308. The portion 302 may be adapted with a quick couple/disconnect assembly for coupling to the distal end of the oxygen-enriched fluid delivery hose 301. Alternately, as shown in FIG. 6B, the main body portion 302 may include a female threaded portion 304 (advantageously having about 8 threads per inch) for receiving the distal end of the hose 301. An o-ring 306 is used to seal the hose coupling to prevent fluid from the hose from bypassing the exitways 308. Advantageously, the nozzle may be configured to have an outer diameter of about 3 inches; a length of about 2 inches; and up to 500 or more fluid exitways, each about 1.5 inches long and 0.005 inches in diameter. It should be noted that the fluid channels in the fluid exit nozzle 303 advantageously exhibit a cross-sectional area and a length that is chosen to substantially prevent bubble formation and to provide laminar flow of the gas-enriched fluid upon exit from the nozzle 303.

Figure 7:
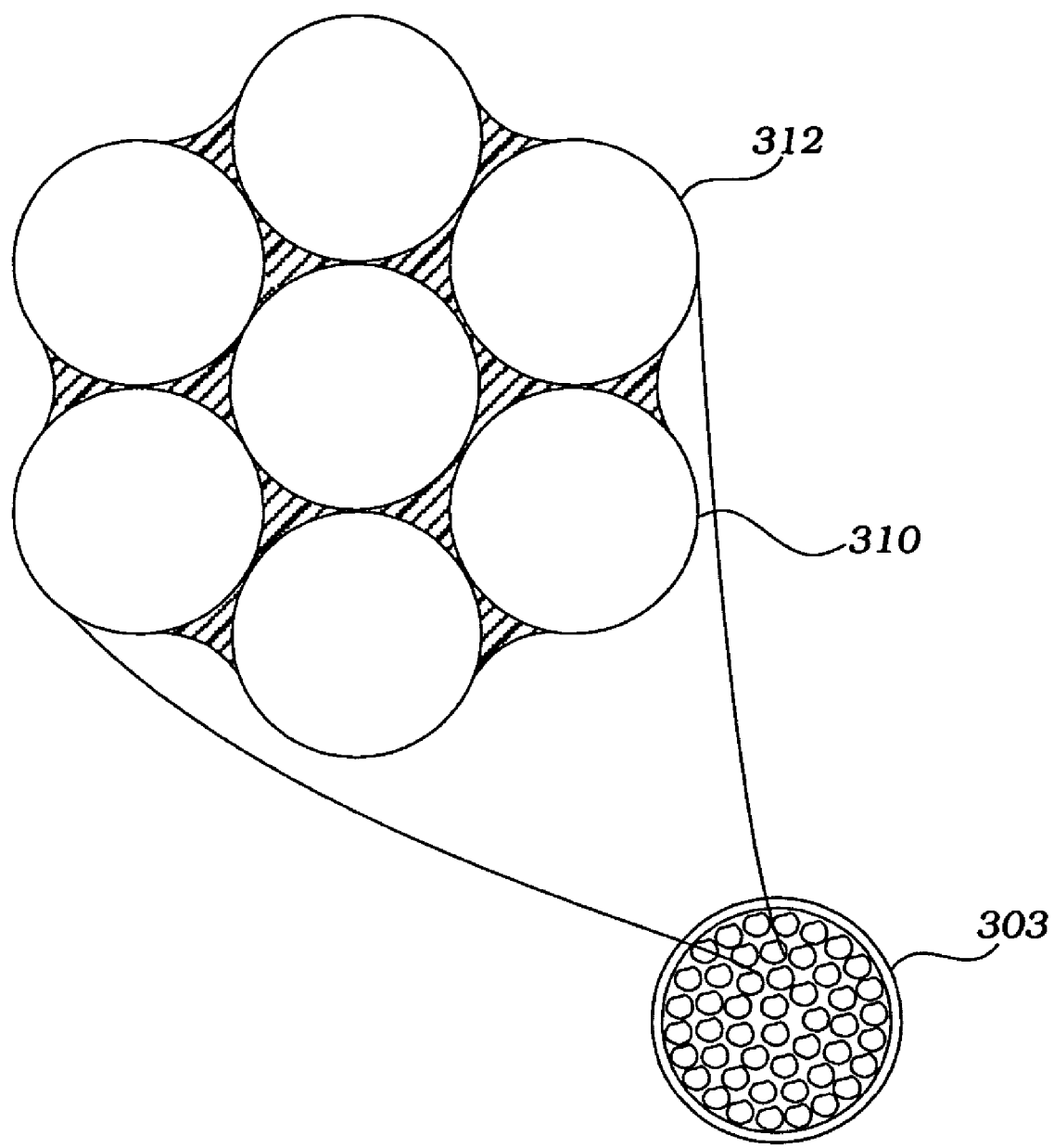
FIG. 7 is an end view of an alternative embodiment of a gas-enriched fluid delivery nozzle, along with an enlarged view of a portion of the nozzle.
Figure 8D:
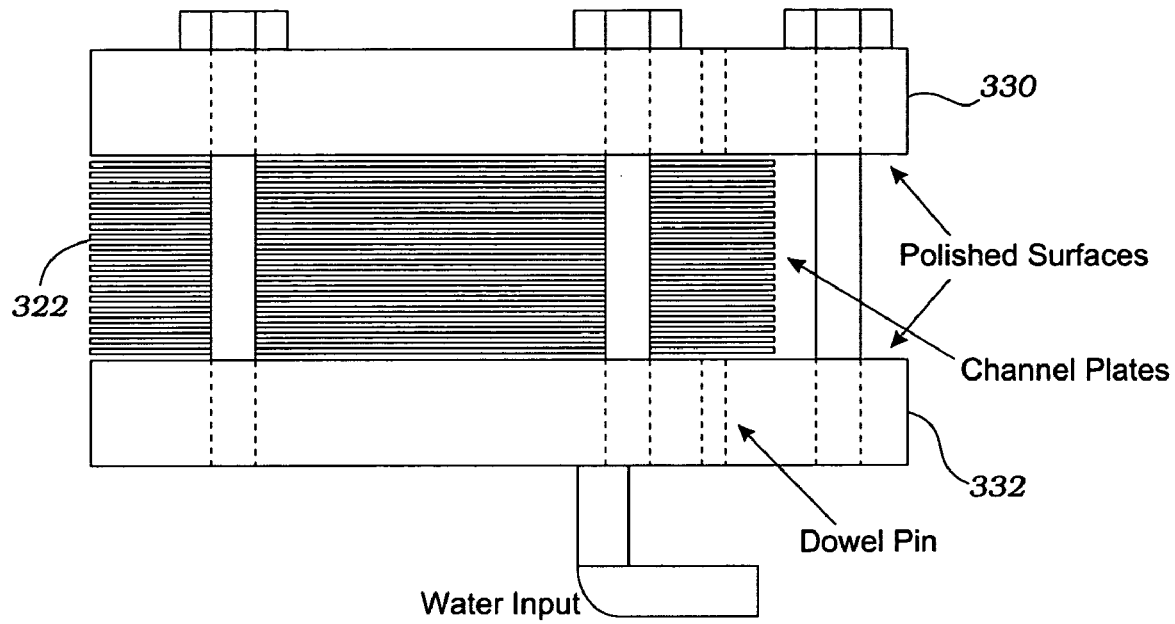
Figure 8E:
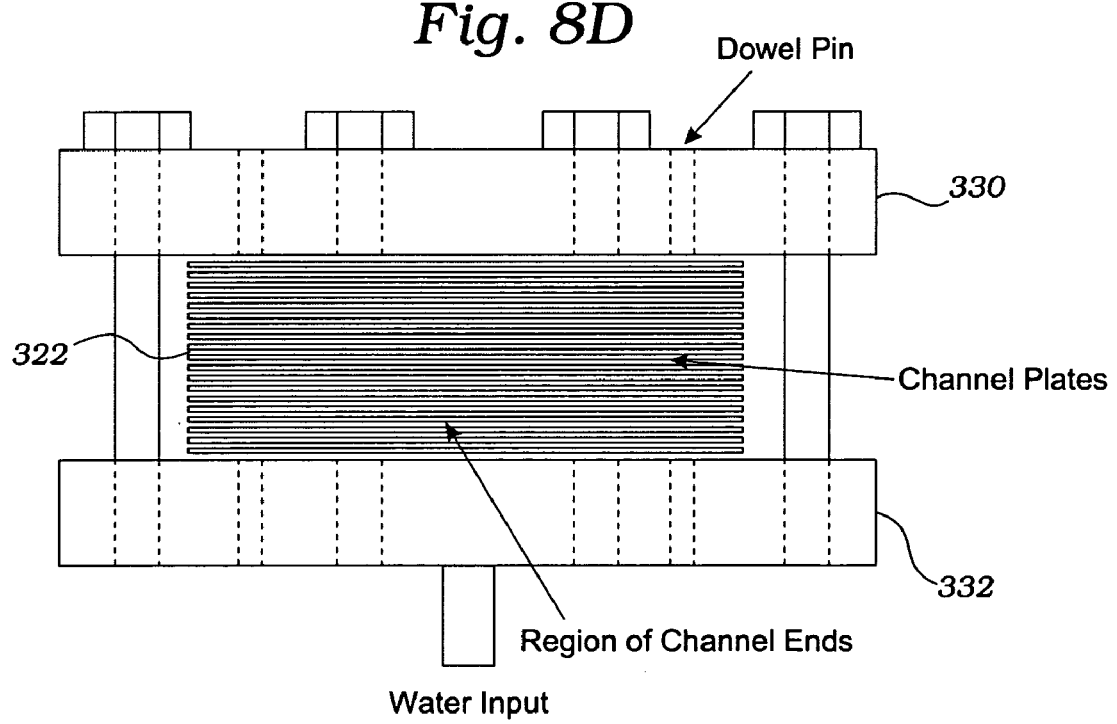

Alternately, as shown in FIG. 7, the fluid exit nozzle 303 advantageously comprises a plurality of small capillaries 310, which may be grouped into tubes 312. For example, each of the capillaries 310 may have an inner diameter of about 150 to 450 microns, and may be disposed with the tubes 312 in groups of about sixty capillaries 310. Each tube 312 is formed by extruding silica over the top of the sixty capillaries 310 as they are brought together, so as to create a capillary bundle within a tube. The tubes 312 advantageously are fixedly attached to each other (e.g., with an epoxy) at their outer surfaces to create a tube bundle. The tube bundle advantageously is about five inches long and about an inch in diameter.

To clean the capillary inlets, the distal end of the hose may include a valve (not shown) that can be opened and closed as desired to allow water to flow rapidly across the capillary inlets to the treatment site. In another embodiment, the capillaries may be flushed by creating a venturi effect that creates backflow in a capillary being cleaned. Alternately, each tube bundle can be replaced and cleaned separately.

In one alternate embodiment illustrated in FIGS. 8A-8E, the fluid exit nozzle 303 may comprise a plate assembly 320 including a stack of plates 322. The plates 322 have a plurality of channels 324 along at least a portion of one side between an edge and a hole in the plates 322. A variety of channel configurations may be suitable, such as those illustrated in FIGS. 9A-F. When a plurality of like plates 322 are joined on top of each other with edges aligned, a block 326 is formed having a hole 328 therethrough. A plurality of channels 324 extend through the block 326 to the hole 328. When a bottom plate 330 without a hole and a top plate 332 including a port 334 are placed on the block 326, a plenum is created.

Figure 10:
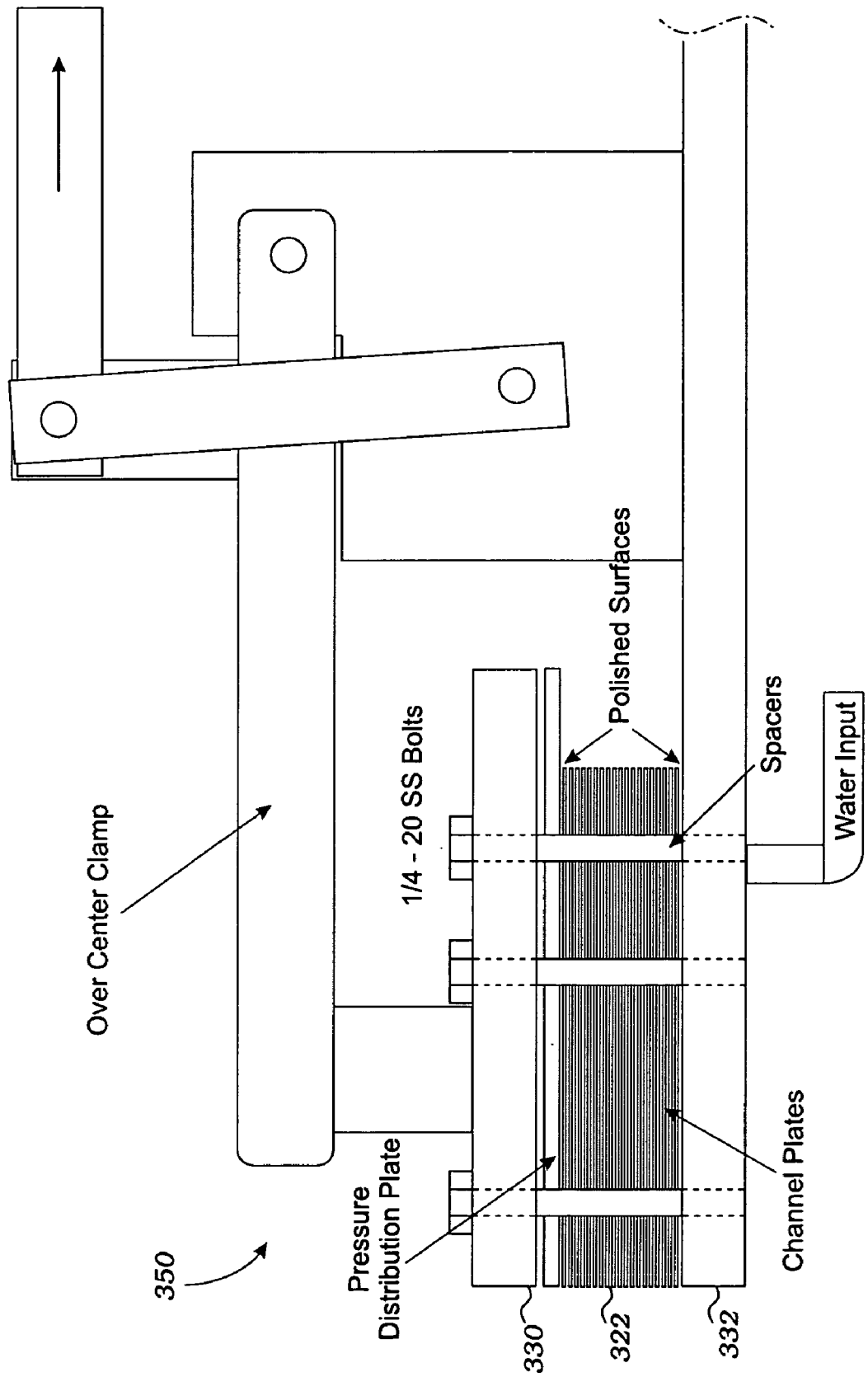
FIG. 10 illustrates an exemplary clamping assembly that may be used in conjunction with a plate-based nozzle, such as the nozzle shown in FIGS. 8A-E.

As illustrated in FIG. 10, the plates 322 may be placed in an assembly 350 operable to separate the plates 322 as desired to permit cleaning. The surfaces of the plates 322 exposed to fluid during operation advantageously are smooth (e.g., as a result of polishing) and are cleaned with alcohol prior to use, so as to minimize the number of sites at which bubbles may nucleate and grow.

Rather than using flat plates, an alternate embodiment may employ one or more conical plates to create an annular array of fluid pathways. The conical plates have small and broad ends, inner and outer surfaces between the ends, and a plurality of channels extending between the ends on at least one of the surfaces. The channels may extend linearly or curvilinearly between the small and broad ends, and they may assume a variety of cross-sections and spacings along the surfaces. The conical plates stack in series such that the outer surface of one conical plate is disposed within the inner surface of another conical plate, thereby creating an annular array of fluid pathways between adjacent conical plates as the channels are enclosed by the adjacent inner or outer surfaces. The conical plates are then truncated at the small ends to provide a common entry position for the fluid pathways. Oxygen-enriched water enters at the common entry position, flows through the fluid pathways and disperses at the broad ends. The conical plates may be designed such that the broad ends form a particular exit surface, for example, flat, concave, or conical, which may improve flow characteristics, provide a specific spray pattern, or alter other characteristics. Alternatively, the conical plates may be configured such that the oxygen-enriched water enters at the broad end, truncated and aligned to form the common entry position, and exits at the small end.

The conical plate design is advantageous for simplifying assembly, since the conical plates are easily aligned, stacked and secured without a separate mounting apparatus. Properly configured, the oxygen-enriched water flow advantageously forces the individual conical plates together during use, thereby maintaining close contact of the surfaces. The conical plate design is also advantageous for cleaning, which may be achieved by backflushing the conical plate assembly. By reversing the flow through the conical plate assembly, the individual conical plates are forced to separate, and debris is washed away.

Figure 11:
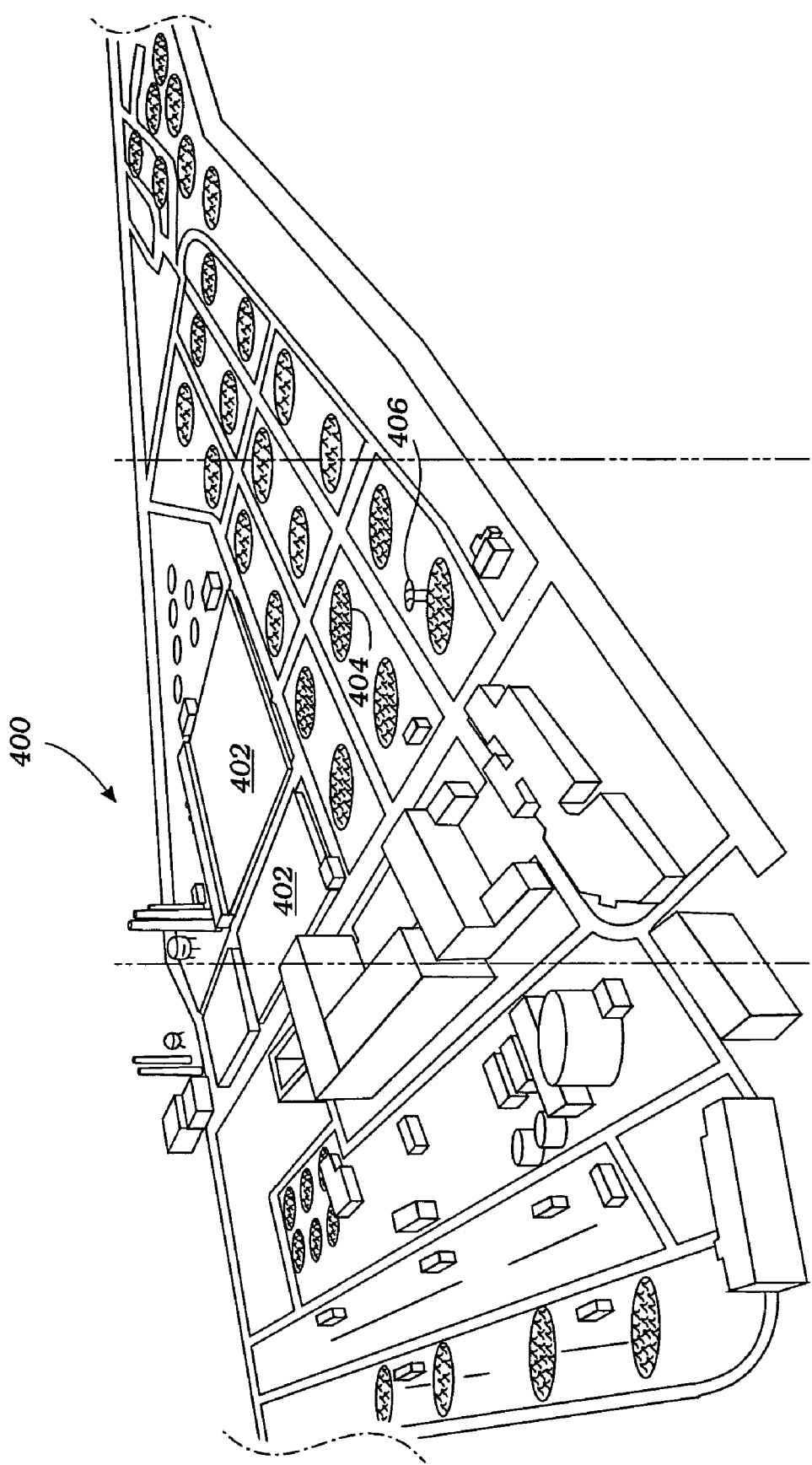
FIG. 11 illustrates a wastewater treatment plant utilizing a system for oxygenating wastewater including an oxygen-enriched fluid supply system in accordance with the present invention.

The system for oxygenating wastewater including an oxygen-enriched fluid supply system may be used in a wastewater treatment system, such as a municipal wastewater treatment plant 400 illustrated in FIG. 11. Specifically, the system may be utilized in one or more of the aeration tanks 402 or clarifier tanks 404. It should be noted that the nozzle(s) 303 of the system may be placed in the tanks 402 and/or 404 to provide oxygen-enriched fluid to the wastewater contained therein. In this situation, it may be desirable to include one or more mixers (not shown) in the tanks 402 and/or 404 in the vicinity of the nozzle(s) 303 to facilitate oxygenation of the wastewater therein. Alternatively, the nozzle(s) 303 may be placed in a secondary tank 406 located separate from the tanks 402 and 404. In this situation, the oxygenated water flows into the secondary tank 406, which then delivers the oxygenated water into the associated tank 402 or 404 via an appropriate delivery system, such as a gravity fed line(s) or a pump and line(s) combination. As mentioned above, it may be desirable to include one or more mixers (not shown) in the tanks 402 and/or 404 in the vicinity of the line(s) to facilitate oxygenation of the wastewater therein. By keeping the nozzle(s) 303 out of the wastewater in the tanks 402 and 404, the nozzles will remain much cleaner and, thus, generally operate more efficiently.

Although numerous embodiments have been disclosed for treating contaminated water, many modifications are contemplated to address specific wastewater treatment applications requiring gas-enrichment. Wherever aeration of water is required to treat wastewater, the disclosed embodiments, or modified versions thereof, scaled to produce a desired flow rate of oxygen or air-enriched water, may advantageously increase the oxygen content of the wastewater. Compared with conventional aeration techniques, which use diffusion between the liquid/gas interface (i.e., bubbles), the disclosed embodiments are advantageously efficient in transferring gas to gas-depleted host liquids, while providing relatively good control of the level of dissolved gas in the host liquid. Additionally, the disclosed embodiments may advantageously reduce odors from the wastewater and from the gases applied to the wastewater (e.g., by more effective treatment and/or by reducing the amount of gas escaping, or bubbling out, into the environment).

Recognizing these advantages, among many others, various embodiments may be used for water treatment in agricultural and aquacultural sites. For example, animal farms, particularly pig farms, typically generate considerable waste in a concentrated area, making waste management, odor control and water contamination a problem. Where crops are grown and cultivated, fertilizers and pesticides may contaminate the water, for example, by running off the crops and land with rainfall. These water quality problems are compounded by odor concerns, standard aeration techniques contribute to the problem. Similarly, marine tanks, fish farms, and hatcheries typically concentrate marine life in a relatively small tank, pool or body of water, wherein water quality and oxygenation may become a problem. In specialized applications such as these, where conventional treatment techniques may be insufficient, too costly, or generally undesirable, the disclosed embodiments advantageously provide a flexible and potentially economical solution to water treatment. To reduce costs, atmospheric air or compressed air may be used rather than pure oxygen. For example, it may be more economical to use an air compressor where the apparatus is used for aerating large bodies of water, such as rivers, ponds and lakes. The disclosed embodiments may also be designed as, or retrofitted to, a mobile deployment system, which may be moved from one treatment site to another. The mobile deployment system may be removably or fixably mounted to a truck, to a trailer, to a boat or other watercraft, to an aircraft such as a helicopter, to carts as disclosed above, or any reasonably mobile unit. A mobile system such as this would be flexible and quite advantageous for non-site specific and/or emergency applications.

A variety of applications may require alternative gases, other than air or oxygen, to address specific contaminants, purify the water or wastewater, or generally, to attain desired properties of the water or wastewater. For example, anaerobic bacteria are used in some bioreactors to synthesize organic compounds, with dissolved carbon monoxide as a carbon source. Unlike carbon dioxide, both carbon monoxide and oxygen are only sparingly soluble in water. As a result, conventional techniques, such as bubbling or mixing, may fail to provide sufficient carbon monoxide to keep pace with the metabolic capacity of the anaerobic bacteria. In contrast, a modified system applying the presently disclosed embodiments could enrich the water or wastewater with carbon monoxide at a relatively high transfer efficiency, advantageously approaching 100 percent.

The disclosed embodiments also reduce gas loss, which may be costly and undesirable in many applications. Conventional techniques often involve bubbling a gas through a liquid, providing minimal gas-to-liquid transfer and considerable gas loss as the gas bubbles exit the liquid. The presently disclosed techniques provide efficient gas-to-liquid transfer, and do so in isolation from the host liquid, i.e., a host water environment such as a pond, reservoir, etc., and drive off VOC's and odors. Provided that the solubility limit of the gas in the host water is not exceeded, bubbles are essentially eliminated, and only gas-enriched water is delivered to the host water. Furthermore, the transfer rate is primarily dependent on the flow rate through the disclosed embodiments, rather than the relatively slow diffusion rate limiting conventional techniques. The substantial reduction of bubbles and improved gas to liquid transfer is also advantageous to controlling undesirable odors, which are partially caused by the wastewater and partially due to gas odors (e.g., in conventional techniques, where alternative gases are bubbled through the wastewater) from incomplete gas to liquid transfer.

Accordingly, alternative embodiments may effectively employ gases such as ozone, carbon monoxide, chlorine gas, inert gas, or other useful gases. For example, ozone may be used to disinfect or sterilize a liquid such as water, by oxidizing contaminants out of the liquid. Contaminants such as lead and cyanide, among others, may be effectively ozonated out of a liquid and into an insoluble compound, while any excess from the ozonation process generally reduces to ordinary oxygen. Ozone may also be used to reduce contamination and waste involved with materials production and processing, such as anodizing aluminum, cross-linking of synthetic polymers and natural fibers such as collagen, and bleaching processes found in paper production. In the anodizing process, ozone saturated solvents could be used instead of acids, thereby reducing the toxicity of waste materials. For further example, hydrogen gas-enriched water may be used to enhance the degradation of chlorinated solvents in groundwater. Alternatively, water enriched with alternative gases, such as ozone, chorine or gases "toxic" to certain organisms, may be employed in open bodies of water to treat specific problems, such as the eradication of zebra mollusks that clog water vents in the Great Lakes.

Because the embodiments permit delivery of a liquid highly enriched with a gas to be delivered to a host environment without immediate nucleation in the effluent from the nozzles, the gas concentration of the host environment, whether an empty reservoir or a host liquid, can be raised to hyperbaric levels. Numerous applications that take advantage of this effect are now possible, as a result. Several examples follow.

In wastewater treatment, increasing the air or oxygen concentration of the host liquid to hyperbaric gas concentrations results in heterogeneous nucleation in the host liquid. The nucleation will typically take place on suspended particles, including ones of microscopic size. The growth of bubbles on these particles then results in flotation of the particles, as they are carried upward by the buoyancy of the bubbles, to the upper layers or surface of the host liquid. Skimming the surface of the host liquid can then be used to remove the particulate. This process is more efficient than simply bubbling the host liquid from, for example, an aeration diffuser plate at the bottom of the host liquid. The preformed bubbles will not attach to the small particles with an efficiency comparable to the advantageous efficiency of the heterogeneous nucleation process provided by the present embodiments.

Use of the embodiments to increase the oxygen concentration of the host liquid to hyperbaric levels is advantageous in numerous oxidation processes. For example, removal of heavy metals and sulfides in polluted water, which can be initiated with addition of a peroxide, can be enhanced by high oxygen concentrations in the water as provided by the embodiments, thereby reducing the need for the peroxide. This is an advantage, since leftover peroxide is toxic to biologic organisms.

In many bioreactor applications, wherein yeast, fuigi, or bacteria require oxygen to produce a desired product or result, the ability to provide high levels of oxygen in the host liquid would increase the yield of the product or result. A higher concentration of the organism could be supported in the bioreactor, and when the rate of formation of the product is dependent on oxygen concentration, the rate will increase along with the increased levels of oxygen provided by the embodiments. In this application, the high level of oxygen would be adjusted to be below the level that results in excessive nucleation and formation of froth.

In anaerobic bioreactors, carbon monoxide may be used as a carbon source for biosynthesis of organic molecules. Applying the embodiments, high levels of carbon monoxide, including hyperbaric levels, are achievable in the host liquid, so that the reaction rate of the bioproduct can be accelerated. An increase in the reaction rate would make the process more efficient and more economical.

In the beverage industry, a high level of supersaturation of the beverage with a gas such as carbon dioxide is often desirable. The embodiments may be used to dispense a beverage highly supersaturated with a gas such as carbon dioxide, air, or oxygen. The gas-enriched liquid may be dispensed either as gas-enriched water that is mixed with ordinary syrup, or as the final gas-enriched beverage. Compared to the use of ordinary dispensers, the gas-enriched beverage provided by the embodiments will be less frothy and will retain the high level of gas for a longer period of time. Less froth will also expedite filling of a beverage glass or cup.

In the spa industry and in homes, the embodiments may be used to deliver water with a high level of gas supersaturation as provided in either a bath or a shower. The most economical gas is air, but air enriched with oxygen or pure oxygen can be used to provide high levels of oxygen in contact with the skin. High levels of oxygen may be helpful for enhancing collagen synthesis, reducing skin hypoxia, and oxidative killing of microorganisms. In addition, the fine effervescence that occurs in the water in contact with skin provides a unique invigorating sensation. In addition to air and oxygen, high levels of carbon dioxide in water can also be used for some applications, wherein vasodilation of skin vessels is desirable. A mixture of gases, such as carbon dioxide and oxygen, may also be beneficial in some instances.

There are numerous other examples, wherein a high level of gas in a host liquid under ambient pressure is achievable and advantageous with each embodiment. For example, water enriched with air can enhance water jet cleaning of surfaces and can facilitate snow making at temperatures above 0° C., and water enriched with an inert gas such as nitrogen or carbon dioxide can be used to more efficiently extinguish a fire.

The embodiments may be used with a wide variety of liquids. For example, liquid fuels, such as alcohols, oils, gasoline, and diesel fuel can be enriched with oxygen and, when delivered through a small orifice, subsequent combustion and oxidation of the fuel will be more complete. The presence of oxygen already in the fuel may act as a catalyst and/or the combustion may proceed at a higher temperature. In addition to the presence of oxygen in the fuel (the solubility of oxygen in fuels is much greater than for water), production of a fine mist from a small orifice can be used to produce microscopic bubbles suspended in a gaseous environment (e.g., air). The microbubbles are produced when the liquid first breaks up into tiny droplets and gas nucleation in each droplet produces a microbubble. The thin skin of fuel comprising the wall of the microbubble provides a very broad surface area for facilitating more complete combustion of the fuel. As a result, fuel efficiency will increase and emission of undesirable reactants, products, and particulate will be reduced.

It should be apparent that the embodiments may also be used to enhance any chemical or biologic reaction, wherein a high level of gas within a liquid is advantageous at ambient pressure. In addition to ordinary liquids, liquid melts of solids such as polymers and metals can be enriched with a gas with use of the embodiments.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

The invention claimed is:

1. A method of treating a wastewater comprising the acts of:

pressurizing a vessel with a treatment gas; and delivering the wastewater, in an atomized state, into the vessel to gas-enrich the wastewater to a desired gas content.

2. The method of claim 1, comprising the acts of:

withdrawing the wastewater from a supply of wastewater to be treated; and expelling the wastewater, at about the desired gas content, back into the supply of wastewater.

3. The method of claim 1, comprising the act of atomizing the wastewater.

4. The method of claim 1, comprising the act of filtering the wastewater.

5. The method of claim 4, wherein the act of filtering comprises passing the wastewater through a series of increasingly fine filters.

6. The method of claim 4, wherein the act of filtering comprises passing the wastewater through a 150 to 450 micron filter.

7. The method of claim 4, wherein the act of filtering the wastewater comprises passing the wastewater through a self cleaning filter.

8. The method of claim 1, comprising the act of:

delivering the wastewater to the vessel through a stinger disposed within the vessel, the stinger having a pipe adapted to carry the wastewater and at least one nozzle, operatively coupled to the pipe, to atomize the wastewater into the vessel.

9. The method of claim 1, comprising the act of:

delivering the wastewater to the vessel through at least one nozzle disposed adjacent to an inner wall of the vessel, the nozzle atomizing the wastewater into the vessel.

10. A method of treating a wastewater, comprising the acts of:

pressurizing a vessel with a treatment gas;

delivering the wastewater, in an atomized state, into the vessel to gas-enrich the wastewater to a desired gas content;

expelling the wastewater from the vessel through a fluid conduit; and passing the wastewater through a nozzle coupled to the fluid conduit.

11. The method of claim 10, wherein the act of expelling the wastewater comprises the act of passing the wastewater through a hose.

12. The method of claim 10, wherein the act of passing the wastewater through the nozzle comprises the act of:

passing the wastewater through a plurality of fluid passageways dimensioned to provide a substantially laminar and bubble-free flow.

13. The method of claim 10, wherein the act of passing the wastewater through the nozzle comprises the act of:

passing the wastewater through a plurality of stacked plates defining a plurality of fluid channels therebetween, the fluid channels having an inlet fluidically coupled to the fluid conduit and having an outlet.

14. The apparatus of claim 10, wherein the act of passing the wastewater through the nozzle comprises the act of:

passing the wastewater through a plurality of capillaries, each of the capillaries having an inlet fluidically coupled to the fluid conduit and having an outlet.

15. A method of treating a wastewater, comprising the acts of:

pressurizing a vessel with a treatment gas;

delivering a water to be gas-enriched, in an atomized state, into the vessel to gas-enrich the water to a desired gas content;

expelling the gas-enriched water from the vessel through a fluid conduit;

delivering the gas-enriched water to a treatment site containing the wastewater to be treated; and adding the gas-enriched water to the wastewater, whereby the addition of gas-enriched water to the wastewater raises the treatment gas content in the wastewater to a desired level.

16. The method of claim 15, wherein the water to he gas-enriched is one selected from the consisting of: a tank of clean water, a pond, a lake, a stream, and a river.

17. The method of claim 15, wherein the act of expelling the gas-enriched water is through a hose.

18. The method of claim 15, further comprising the act of passing the gas-enriched water through a nozzle coupled to the fluid conduit.

19. The method of claim 18, wherein the act of passing the gas-enriched water through the nozzle comprises the act of:

passing the gas-enriched water through a plurality of stacked plates defining a plurality of fluid channels therebetween, the fluid channels having an inlet fluidically coupled to the fluid conduit and having an outlet.

20. The method of claim 18, wherein the act of passing the gas-enriched water through the nozzle comprises the act of:

passing the gas-enriched water through a plurality of capillaries, each of the capillaries having an inlet fluidically coupled to the fluid conduit and having an outlet.

* * * * *